(12) United States Patent
Borshch et al.

(10) Patent No.: US 9,400,412 B2
(45) Date of Patent: Jul. 26, 2016

(54) NANOSECOND LIQUID CRYSTALLINE OPTICAL MODULATOR

(71) Applicants: Volodymyr Borshch, Kent, OH (US);
Sergij V. Shiyanovskii, Stow, OH (US);
Oleg D. Lavrentovich, Kent, OH (US)

(72) Inventors: Volodymyr Borshch, Kent, OH (US);
Sergij V. Shiyanovskii, Stow, OH (US);
Oleg D. Lavrentovich, Kent, OH (US)

(73) Assignee: KENT STATE UNIVERSITY, Kent, OH (US)

( * ) Notice: Subject to any disclaimer, the term of this patent is extended or adjusted under 35 U.S.C. 154(b) by 218 days.

(21) Appl. No.: 14/332,502

(22) Filed: Jul. 16, 2014

(65) Prior Publication Data

US 2016/0018679 A1 Jan. 21, 2016

(51) Int. Cl.
*G02F 1/137* (2006.01)
*C09K 19/54* (2006.01)
*G02B 6/02* (2006.01)
*G02F 1/13363* (2006.01)
*C09K 19/52* (2006.01)

(52) U.S. Cl.
CPC .............. *G02F 1/137* (2013.01); *C09K 19/544* (2013.01); *G02B 6/02* (2013.01); *G02F 1/13363* (2013.01); *C09K 2019/521* (2013.01)

(58) Field of Classification Search
CPC ....................................................... G02F 1/137
See application file for complete search history.

(56) References Cited

U.S. PATENT DOCUMENTS

| 4,367,924 A | 1/1983 | Clark et al. |
| 4,917,452 A | 4/1990 | Liebowitz |
| 4,948,229 A | 8/1990 | Soref |
| 6,396,976 B1 | 5/2002 | Little et al. |
| 7,315,665 B1 | 1/2008 | Anderson |
| 8,054,413 B2 | 11/2011 | West et al. |

(Continued)

FOREIGN PATENT DOCUMENTS

| CA | 1284373 | 5/1991 |
| WO | 92/04653 | 3/1992 |
| WO | 00/26720 | 5/2000 |

(Continued)

OTHER PUBLICATIONS

Volodymyr Borshch et al., "Nanosecond Electro-Optic Switching of a Liquid Crystal," Physical Review Letters, PRL 111, 107802 (2013), Sep. 6, 2013, American Physical Society, 107802-1 through 107802-5.

*Primary Examiner* — Timothy L Rude
(74) *Attorney, Agent, or Firm* — Fay Sharpe LLP

(57) ABSTRACT

An optical modulator includes a liquid crystal cell containing liquid crystal material having liquid crystal molecules oriented along a quiescent director direction in the unbiased state, and a voltage source configured to apply an electric field to the liquid crystal material wherein the direction of the applied electric field does not cause the quiescent director direction to change. An optical source is arranged to transmit light through or reflect light off the liquid crystal cell with the light passing through the liquid crystal material at an angle effective to undergo phase retardation in response to the voltage source applying the electric field. The liquid crystal material may have negative dielectric anisotropy, and the voltage source configured to apply an electric field to the liquid crystal material whose electric field vector is transverse to the quiescent director direction. Alternatively, the liquid crystal material may have positive dielectric anisotropy and the voltage source configured to apply an electric field to the liquid crystal material whose electric field vector is parallel with the quiescent director direction.

20 Claims, 23 Drawing Sheets

(56) References Cited

U.S. PATENT DOCUMENTS

2009/0231260 A1 9/2009 Shiyanovskii et al.
2010/0309398 A1* 12/2010 Klement ................ C09K 19/02
349/33

FOREIGN PATENT DOCUMENTS

| WO | 03/063126 | 7/2003 |
| WO | 2011/098130 | 8/2011 |

* cited by examiner

NANOSECOND LIQUID CRYSTALLINE OPTICAL MODULATOR

This invention was made with Government support under grant/contract no. DE-FG02-06ER 46331 awarded by the United States Department of Energy (DOE). The Government has certain rights in this invention.

BACKGROUND

The following generally relates to systems, devices, and methods for modulating liquid crystalline (LC) materials with nanosecond electro-optic response times. The system generally relates to, but is not limited to, LC electro-optical devices, LC shutters, LC lens, spatial light modulators, telecommunication devices, tunable filters, beam steering devices, waveguides, displays, and the like.

Liquid crystals are among the first choice of materials for designing devices in the information display technology sector due to their long-range orientational order, fluidity, and optical birefringence. The effective birefringence of an LC, which is an optical property defined by a refractive index that depends on the polarization and propagation of light, may be manipulated by applying an electric field between opposite electrodes which surround LC material. The applied electric field may be dynamically switched to align LC materials along the direction of the applied field.

This dynamic switching of the applied electric field enables the production of low cost, controllable, electro-optical devices such as Liquid Crystal Displays (LCDs). LCD devices are based on the reorientation of liquid crystal molecules such as liquid crystal (LC) molecules by the application of an electric field. Tremendous efforts have been made to improve the performance of LCDs, especially their switching response time.

Accordingly, response time is one of the most critical issues for LC devices that involve dynamic switching. When dealing with LC material response time, most published literature refers to time to reorientation of the optical axis of LC materials (also known as the director rather than optical response time. For amplitude modulation, e.g., liquid crystal display devices, an LC device is usually sandwiched between two polarizers. The measured quantity is transmittance change and the associated dynamic response is optical rise or decay time. On the other hand, for a phase-only modulator such as optical phased arrays, the measured response time is phase change. In either situation, the optical response time for amplitude modulation and phase response time for phase modulation is understood in the art as being related to the director n̂ reorientation time.

Previous liquid crystal electro-optic studies have induced phase retardation of LC materials primarily by reorientating the director (n̂). However, inducing phase retardation via this established method has drawbacks. The response time for reorienting the director n̂ in this scenario is relatively slow, e.g., on the order of milliseconds.

The systems, devices, and methods according to the present application provide liquid crystalline (LC) materials with nanosecond electro-optic response times. The described systems, devices, and methods operate by fast (several nanoseconds) modifications of order parameters (OP) of LC materials. Applications of the described approaches include electrooptics applications, such as but not limited to liquid crystal shutters, optical switches, light modulators, waveguides, telecommunications devices, liquid crystal lenses, tunable filters, beam steering devices, optical shutters, optical displays, light limiting applications, and others.

BRIEF DESCRIPTION

In some illustrative embodiments disclosed herein, an optical modulator includes a liquid crystal cell containing liquid crystal material having liquid crystal molecules oriented along a quiescent director direction in the unbiased state, and a voltage source configured to apply an electric field to the liquid crystal material wherein the direction of the applied electric field does not cause the quiescent director direction to change. An optical source is arranged to transmit light through or reflect light off the liquid crystal cell with the light passing through the liquid crystal material at an angle effective to undergo phase retardation in response to the voltage source applying the electric field.

In some illustrative embodiments disclosed herein, an optical modulator includes a liquid crystal cell containing liquid crystal material having liquid crystal molecules oriented along a quiescent director direction in the unbiased state, and a voltage source configured to apply an electric field to the liquid crystal material. In some such embodiments the liquid crystal material has negative dielectric anisotropy, and the voltage source is configured to apply an electric field to the liquid crystal material whose electric field direction is transverse to the quiescent director direction. In other such embodiments the liquid crystal material has positive dielectric anisotropy, and the voltage source is configured to apply an electric field to the liquid crystal material whose electric field direction is parallel with the quiescent director direction. An optical source may be arranged to transmit light through or reflect light off the liquid crystal cell with the light passing through the liquid crystal material at an angle effective to undergo phase retardation in response to the voltage source applying the electric field due to one or more of field-enhanced uniaxial order, field-induced biaxial order, and differential quenching of uniaxial director fluctuations induced in the liquid crystal molecules.

An optical modulator device for modulating liquid crystal (LC) materials with nanoseconds response time according to one embodiment includes a housing including LC material, the LC material having an orientational order and an optical axis, a voltage source for applying an electric field to the LC material to affect the orientational order of the LC materials and fluctuations of the optical axis, and because of that, to affect the effective birefringence of the LC materials.

A method for modulating a liquid crystal (LC) material with nanosecond response according to one embodiment includes applying an electric field to an LC slab including LC materials, creating voltage pulses to modify order parameters of the LC material, applying a probing beam to the LC slab, measuring an optical response of the LC materials.

DETAILED DESCRIPTION

In various embodiments, the present disclosure provides system, methods, and devices for modulating a liquid crystal material with nanosecond response times. As disclosed herein, the problem of LC materials with slow response times can be overcome by modifying the uniaxial and biaxial order parameters (OP) of the LC materials rather than reorienting of the director n̂. Modifying the order parameters of a liquid crystal device produces an optical response in the nanosecond range for both on and off processes without the negative factors associated with director reorientation. Both "switch-on" and "switch-off" phases of the liquid crystal optical response may be less than 100 ns.

The systems, devices, and methods of the present application generally relate to inducing additional phase retardation in liquid crystal materials. This occurs not by the reorientation of the optical axis of liquid crystal (the director n̂), but by modifying the order parameters (and therefore birefringence) by applying an electric or magnetic field. This approach is fundamentally different from liquid crystalline electro-optics in which the optical axis of liquid crystal (the director n̂) is reoriented by an applied electric field.

The systems, devices, and methods disclosed herein generally limit the reorientation of the director n̂. Modifying the uniaxial and biaxial order parameters of a liquid crystal device allows it to achieve nanoseconds optical response for both on and off processes. Both "switch-on" and "switch-off" phases of the liquid crystal optical response may be less than 100 ns. The novelty is the biaxial modification of the OP, which allows switching times on the order of several nanoseconds.

The systems and devices could be implemented according to different designs, for example, but not limited to light transmission, reflection, multiple reflection, or in waveguide design. The systems and devices can be widely used in LC displays, LC shutters, LC lens, spatial light modulators, telecommunication devices, tunable filters, beam steering devices, waveguides, and various electrically driven LC devices, among others.

Figure 1:
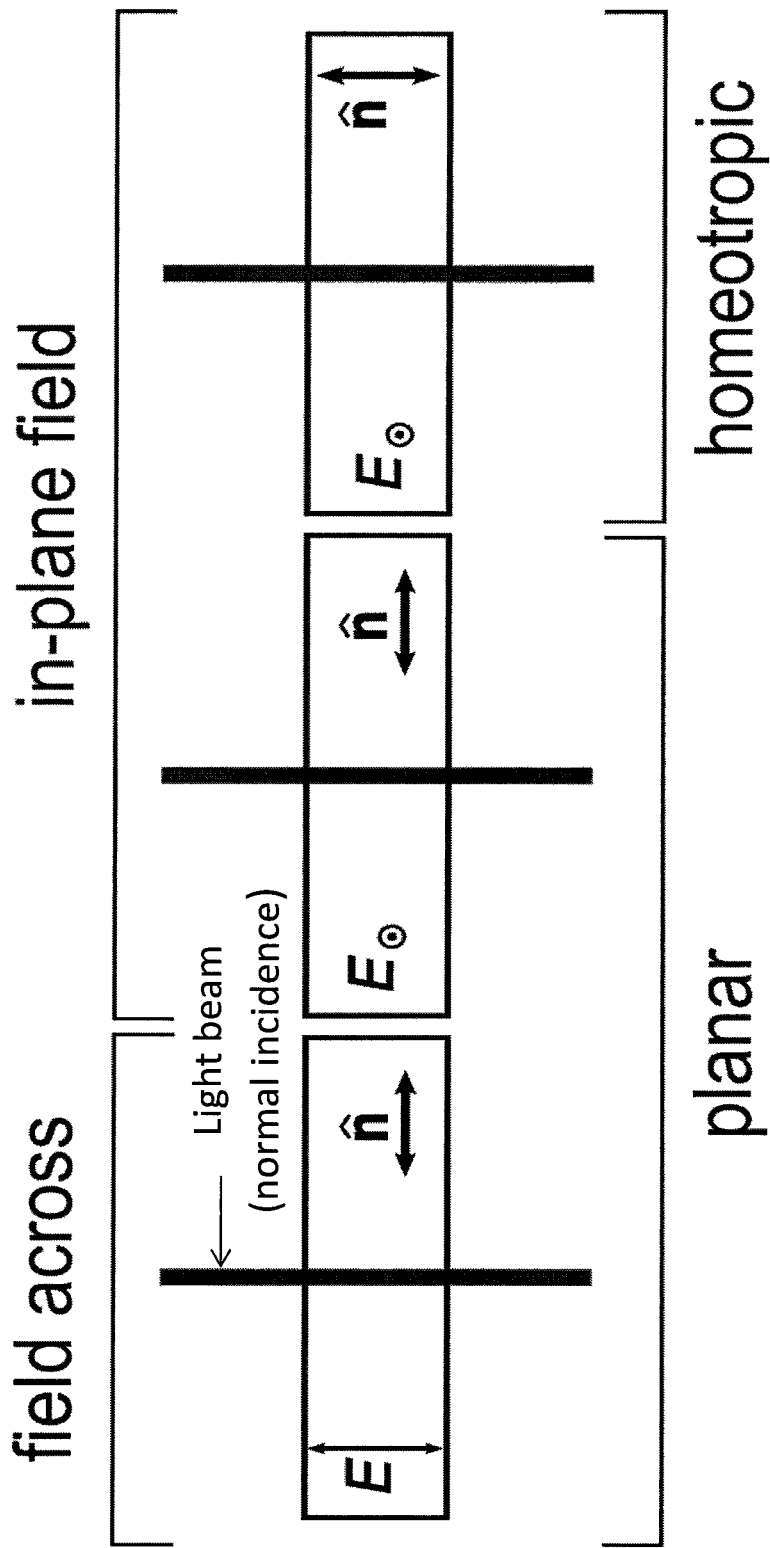
FIG. 1 is a schematic representation showing a normal incidence beam and application of an applied field E (electric or magnetic) to negative anisotropy (dielectric or magnetic) LC materials with either planar or homeotropic alignment.

With reference to FIG. 1, the relative orientation of the director n̂ and applied field E (electric or magnetic) to obtain fast optical modulation (e.g. with response times on the order of nanoseconds to a hundred nanoseconds or so) is illustrated for LC materials with negative anisotropy (dielectric or magnetic) and an incident light beam is normal to the plane of the optical cell. As shown in FIG. 1, there are two illustrated planar geometries and one illustrated homeotropic geometry. These normal incidence geometries are illustrated in order to show possible relative orientations of the director n̂ and applied field E in differently aligned negative anisotropy LC materials. In each case, it will be noted that the electric field is oriented transverse to the direction of the director in its quiescent or unbiased state. For an LC material with negative dielectric anisotropy, the LC directors are biased to orient transverse to the direction of the electric field. Thus, for the geometries shown in FIG. 1, the skilled artisan recognizes that applying the electric field E does not re-orient the director n̂ away from its direction in the quiescent or unbiased state—to the contrary, the electric field E actually reinforces the quiescent or unbiased direction of the director n̂.

Figure 2:
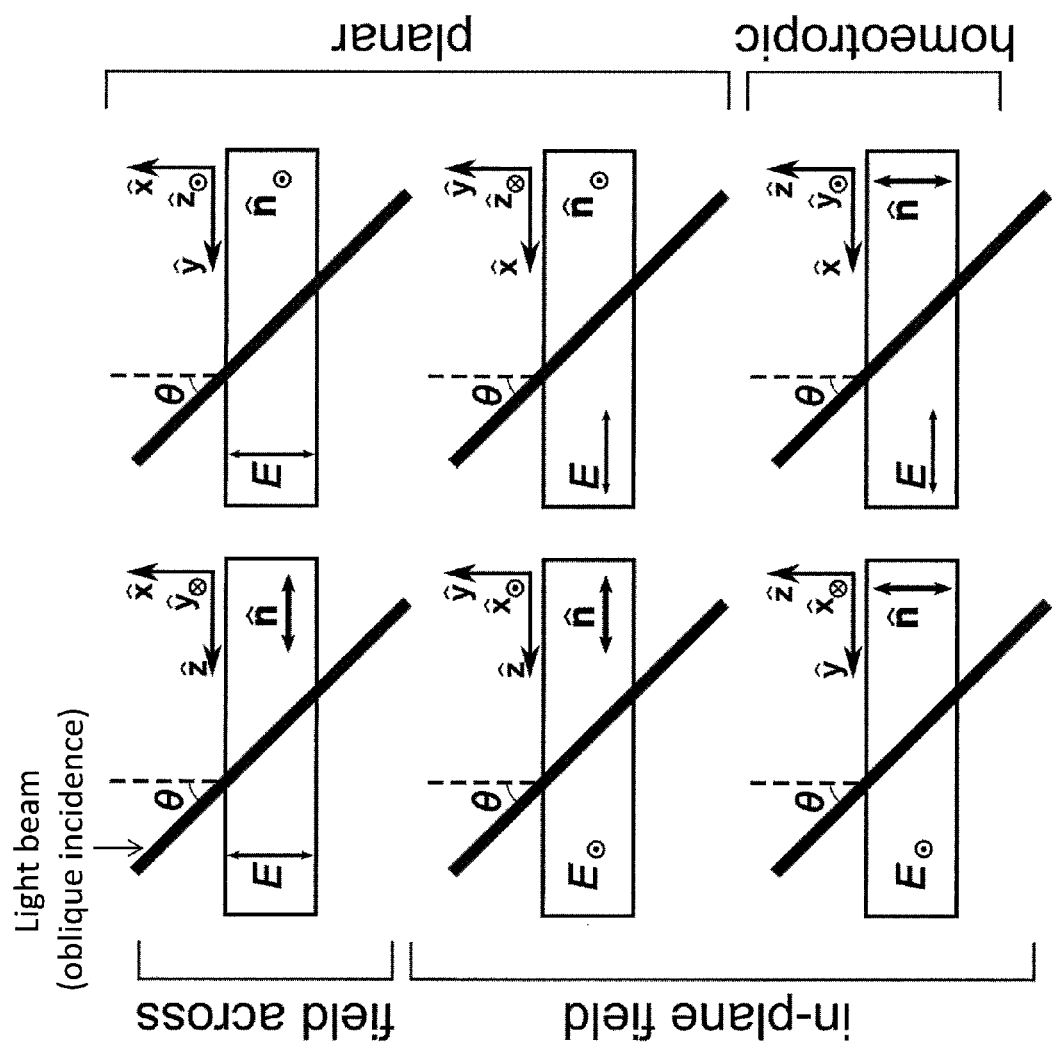
FIG. 2 is a schematic representation showing an oblique incidence beam and application of an applied field E (electric or magnetic) to negative anisotropy (dielectric or magnetic) LC materials with either planar or homeotropic alignment.

With reference to FIG. 2, the relative orientation of the director n̂ and applied field E (electric or magnetic) is demonstrated in LC materials with negative anisotropy (dielectric or magnetic) and an incident light beam is at an oblique angle to the plane. FIG. 2, shows four illustrative planar geometries and two illustrative homeotropic geometries. These oblique incidence geometries are illustrated in order to show possible relative orientations of the director n̂ and applied field E in differently aligned negative anisotropy LC materials. As with the examples of FIG. 1, the electric field E is in each case oriented transverse to the quiescent or unbiased direction n of the directors, so that the electric field E does not reorient the directors.

Figure 3:
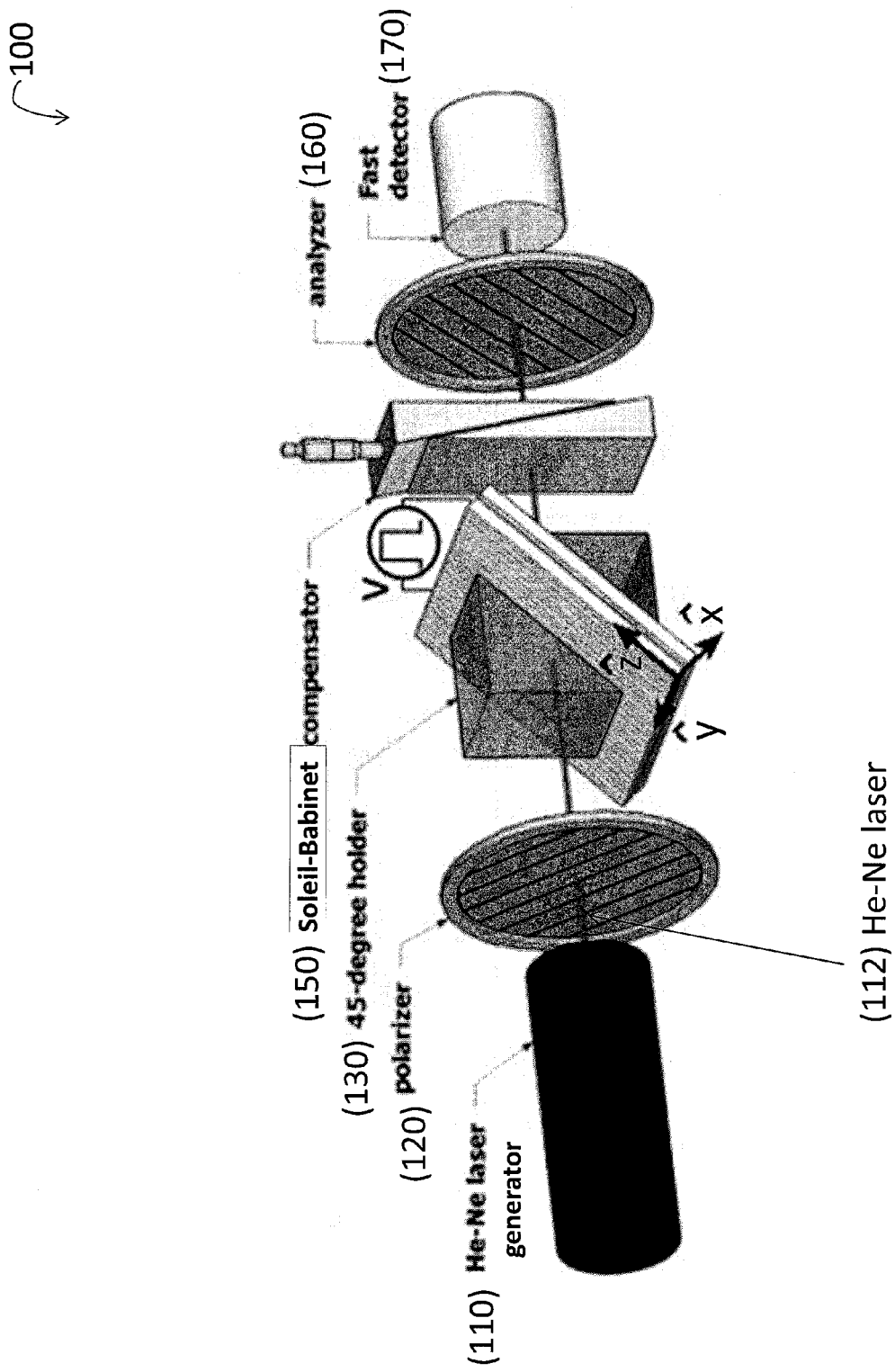
FIG. 3 is an illustration of an exemplary system for generating nanosecond electrooptic response in LC materials.

With reference to FIG. 3, a system 100 for detecting or measuring optical response signals from a liquid crystal includes a helium-neon (HeNe) laser generator 110. The generator 110 produces a He—Ne laser beam 112 which is first projected onto a polarizer 120. The laser beam 112 then travels to a 45 degree holder 130. This holder 130 generally holds LC material and allows the laser beam 112 to travel through the LC material at a predefined angle, i.e. approximately 45 degrees (described in more detail with reference to FIG. 4). The laser beam 112 then travels through compensator 150 to an analyzer 160. Lastly, the optical response from the liquid crystal is detected by a fast detector 170.

Figure 4:
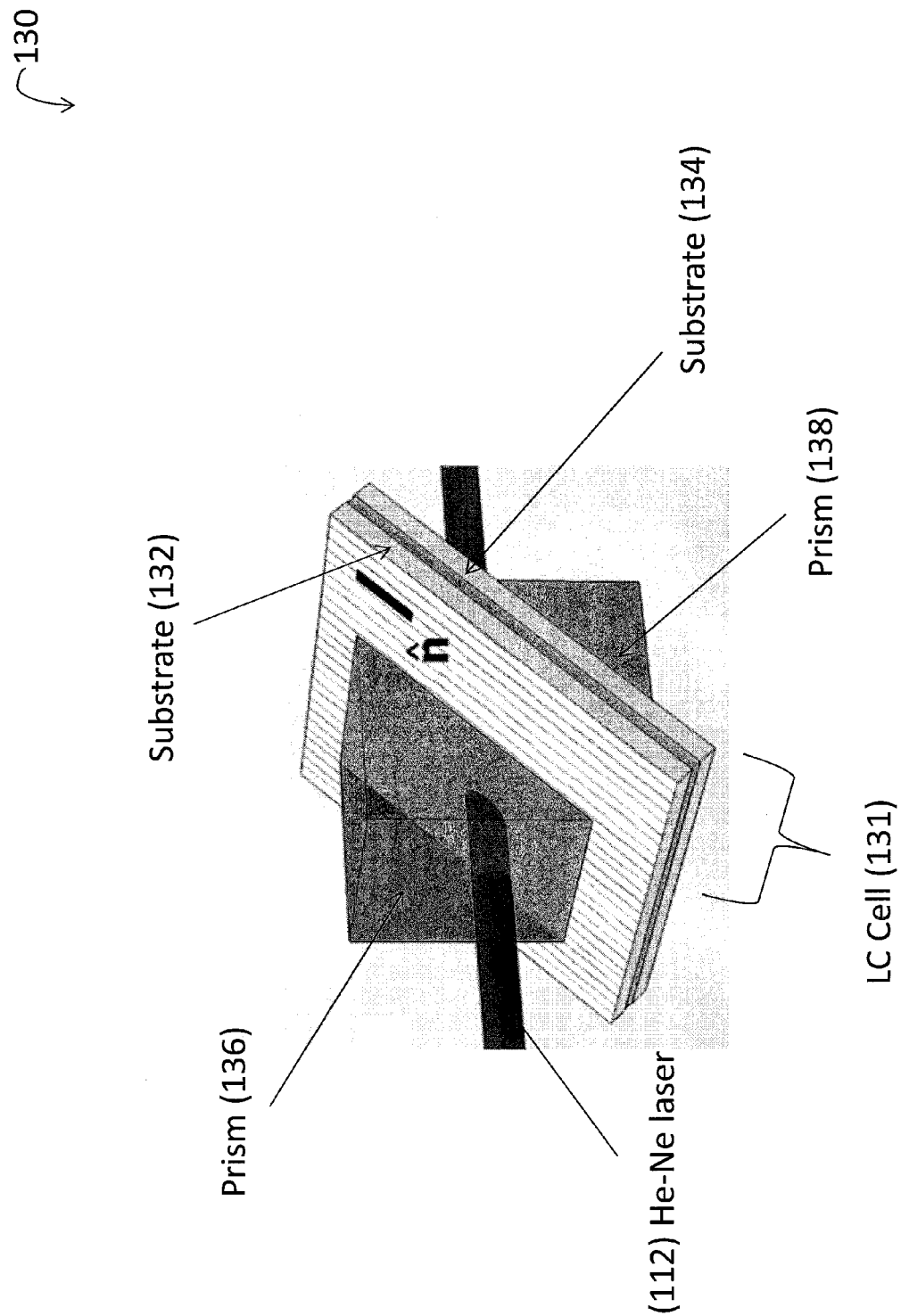
FIG. 4 is an illustration of a 45 degree LC cell holder according to a first exemplary embodiment including triangle glass prisms, and as described in the system of FIG. 3.

With reference to FIG. 4, the 45 degree holder 130 as described in system 100 holds a LC cell 131 including two substrates 132, 134. The substrates 132, 134 may be constructed with indium tin oxide (ITO) electrode of an active area, $A=3\times3$ mm$^2$, separated by the gap, $d=4.2$ μm. A low resistivity ITO (10 Ω/sq) was used. This enables RC-time of the cell to be around $\tau_{RC}=7$ ns.

The inner surfaces of the cell's bounding plates may be coated with a unidirectionally rubbed alignment layer, for which we used polyimide PI-2555 commercially available from HD MicroSystems. The cells are assembled in a parallel fashion. In the illustrative arrangement of FIGS. 3 and 4, the LC cell 131 is sandwiched between two right angle prisms 136, 138. The LC cell 131 may be sandwiched between the two triangular prisms 136, 138 using refractive index-matching oil. This allows for the laser beam 112 to travel through the LC cell 131 at approximately a 45 degree angle. (If the prisms 136, 138 are omitted then in accord with Snell's law the beam direction would be affected by transition at an angle through the change in refractive index at the substrates 132, 134 thus complicating interpretation of the measurements. The prisms 136, 138 simplify the experiment by removing this artifact.). This geometry is used in order to eliminate the optical response contribution originated from the director fluctuations quenching. The cell is oriented in such way that the LC director n̂ is in the incidence plane of a probing beam (as shown on FIG. 4). The sandwich assembly was temperature controlled.

One single strong electric field pulse of $E>10^8$ V/m may be applied so as to not realign the director n̂ and influences only the orientational order. The characteristic rise and fall times of the pulses were 1 ns. In order to measure the electric field induced optic response, a laser beam (He—Ne, $\lambda=632.8$ nm) may be used which is linearly polarized along the direction that makes an angle of 45° with the incidence plane of the LC slab. See FIGS. 3 and 4. The beam passes through the cell 131, Soleil-Babinet compensator, and the analyzer crossed with the polarizer. The transmitted light intensity is measured using a photodetector with response time<1 ns.

In one embodiment, the material in the LC cell 131 is in the nematic phase. The two prisms 136, 138 provide an oblique incidence of the laser beam 112, with the angle of incidence θ being approximately 45 degrees. The polarization direction of the laser beam 112 makes an angle $\beta=45$ degree with the incidence plane of the LC slab. See FIGS. 3 and 4.

The LC cell 131 is oriented in such way that the LC director n̂ is in the incidence plane of a probing beam/probe beam 112 (as shown on FIG. 4). The laser beam travels through the LC cell 131 and the optical response from the liquid crystal may be detected by a fast detector.

In one embodiment, the laser beam traveling through the LC cell 131 has an incidence angle $\theta=45$ degree and the polarization angle $\beta=45$ degree. The reason is that in this geometry, the electrically induced changes in the spectrum of director fluctuations do not contribute to the modification of the properties of the beam 112 passing through the LC material, as taught in [V. Borshch et al, *Phys. Rev. Lett,* 111, 107802, 2013]. On the other hand, the electrically induced changes of the orientational order modify the effective birefringence of the LC material. As a result, the optical signal measured after the beam 112 passes through the core working unit and a pair of crossed polarizers, changes in response to the electric field applied to the LC cell 131.

Figure 5:
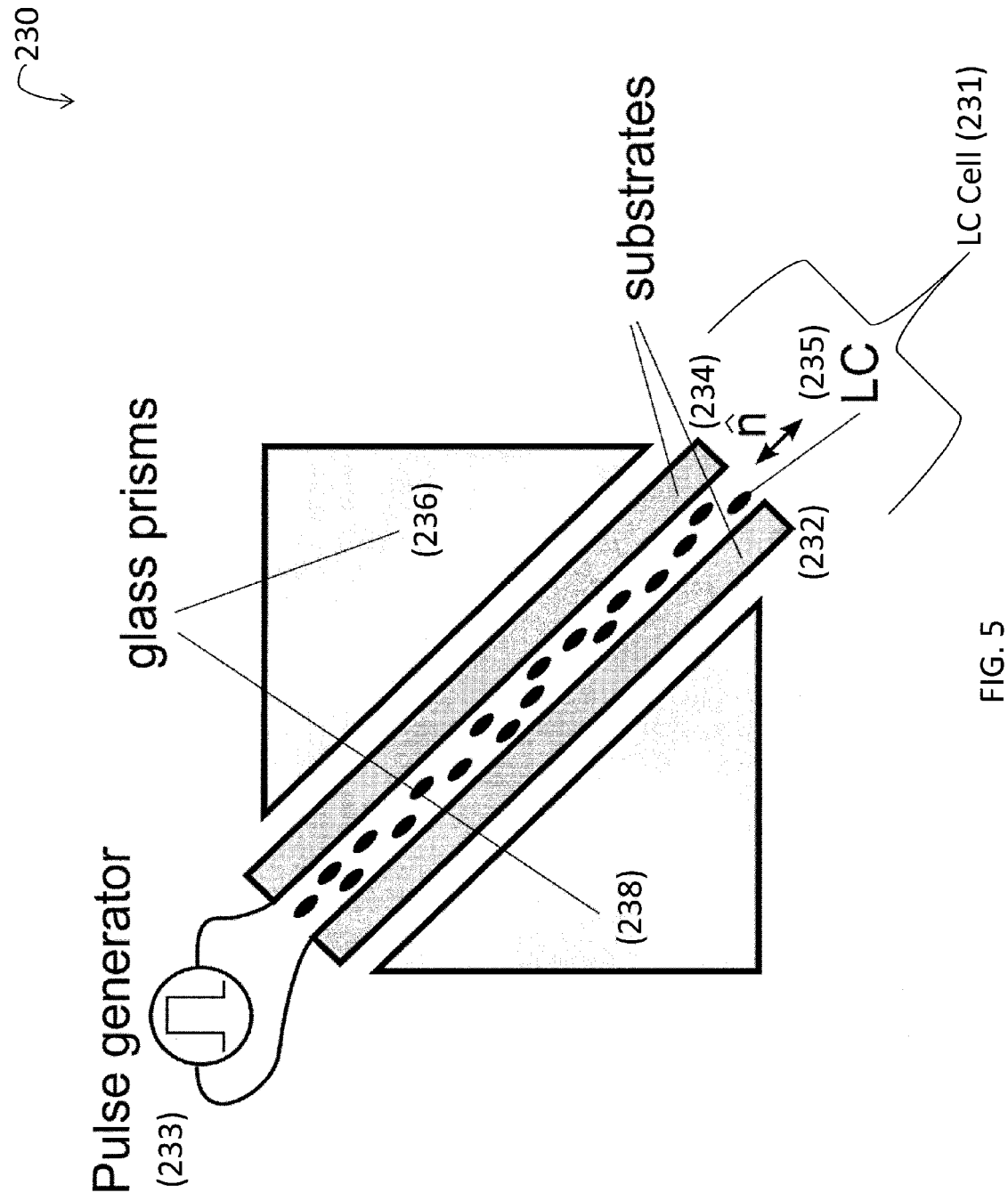
FIG. 5 is an illustration of a 45 degree LC cell holder according to a second exemplary embodiment including triangle glass prisms.

With reference to FIG. 5, a 45 degree holder 230 according to a second exemplary embodiment includes an LC cell 231 including two opposite substrates 232, 234 which surround LC material 235. The substrates 232, 234 are electrically connected by a pulse generator 233. The substrates 232, 234 are held at approximately a 45 degree angle by triangular prisms 236, 238.

The LC material 235 may include substantially any type of liquid crystal material, with positive or negative dielectric and magnetic anisotropy. The LC material 235 may include phases of LCs namely but not limited to: (Cholesteric (N*), Twist-Bend nematic, Splay-Bend nematic, biaxial nematic), Smectic phases (SmA*, SmAP, de Vries Smectic, SmB, SmC, SmC*, SmCP, SmC$_G$, SmD, SmE, SmF, SmG, SmH, Sml, SmJ, SmK, SmL), Columnar phases (with disordered, ordered, and tilted packing within columns; as well as hexagonal, rectangular, and oblique stacking of columns), Bent-core phases ($B_1, B_2, B_4, B_5, B_6, B_{7-I}, B_{7-II}$), Blue-Phases (I, II, and III).

The LC material 235 may include various additives, for example, but not limited to: nanoparticles, polymer networks forming polymer-stabilized systems, e.g., polymer-dispersed liquid crystal (PDLC), polymer-stabilized liquid crystal (PSLC), LC in porous media, LC doped with metal, polymer, dielectric, organic and inorganic nano and submicron particles. The LC material 235 may be located inside matrices, isotropic liquid matrix, polymer matrix, porous materials, or nanodroplets.

Figure 6:
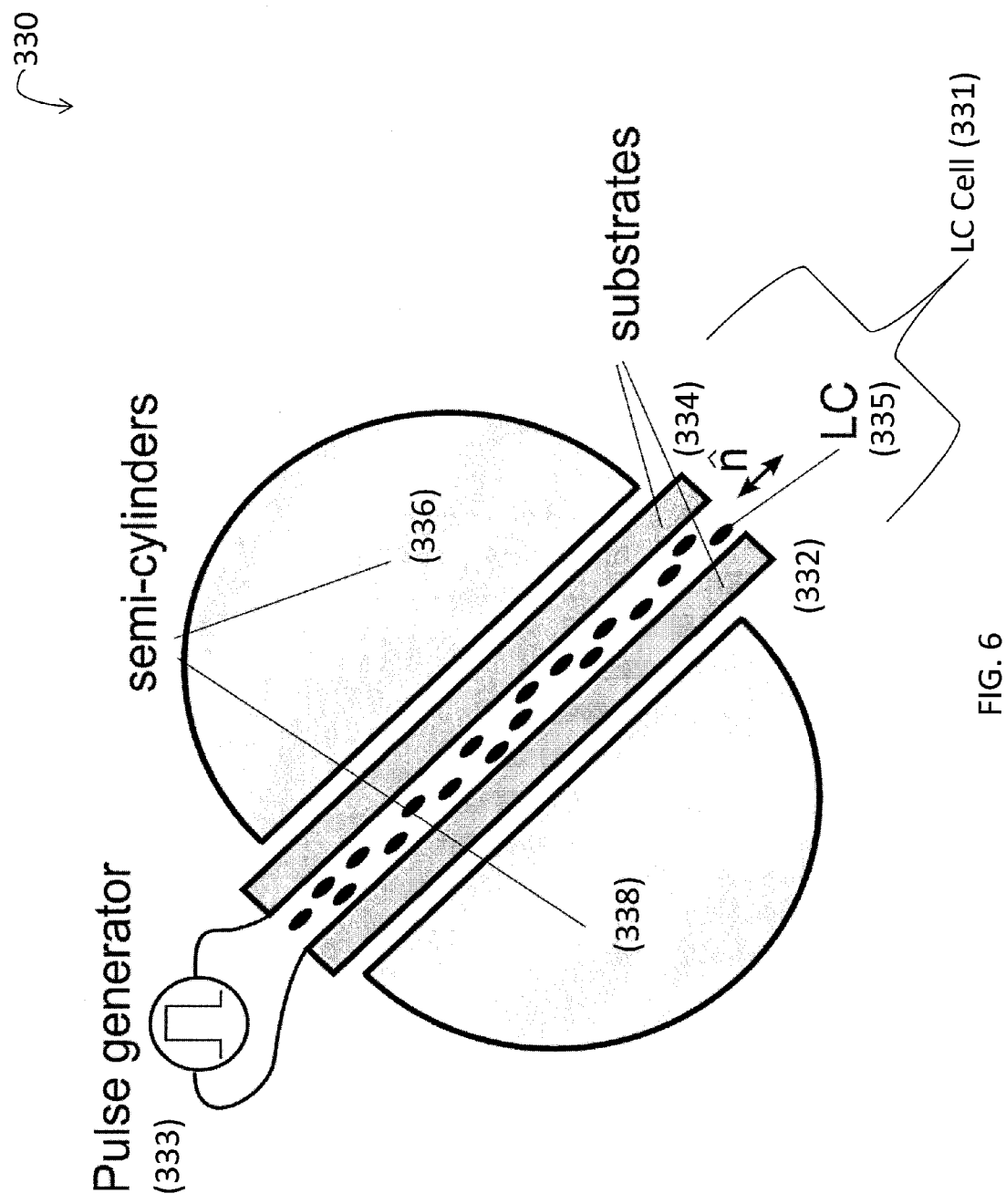
FIG. 6 is an illustration of a 45 degree LC cell holder according to a third exemplary embodiment including semi-cylinder glass prisms.

Another element of the working unit might be optical devices such as two semi-cylinders at the opposite sides of the flat LC cell shown in FIG. 6. This geometry allows one to achieve oblique incidence of light at an arbitrary angle. Nanosecond optical response depends on the direction of light propagation and light polarization.

With reference to FIG. 6, a 45 degree holder 330 according to a second exemplary embodiment may include an LC cell 331 including two opposite substrates 332, 334 which surround LC material 335. The substrates 332, 334 are electrically connected by a pulse generator 333. The substrates 332, 334 are held at an approximately 45 degree angle by semi-cylinder prisms 336, 338. The curvature of the semi-cylinder prisms 336, 338 enable light to be injected and extracted at any angle without being bent by the refractive index transition in accord with Snell's law, again simplifying the experimental setup and interpretation.

Figure 7:
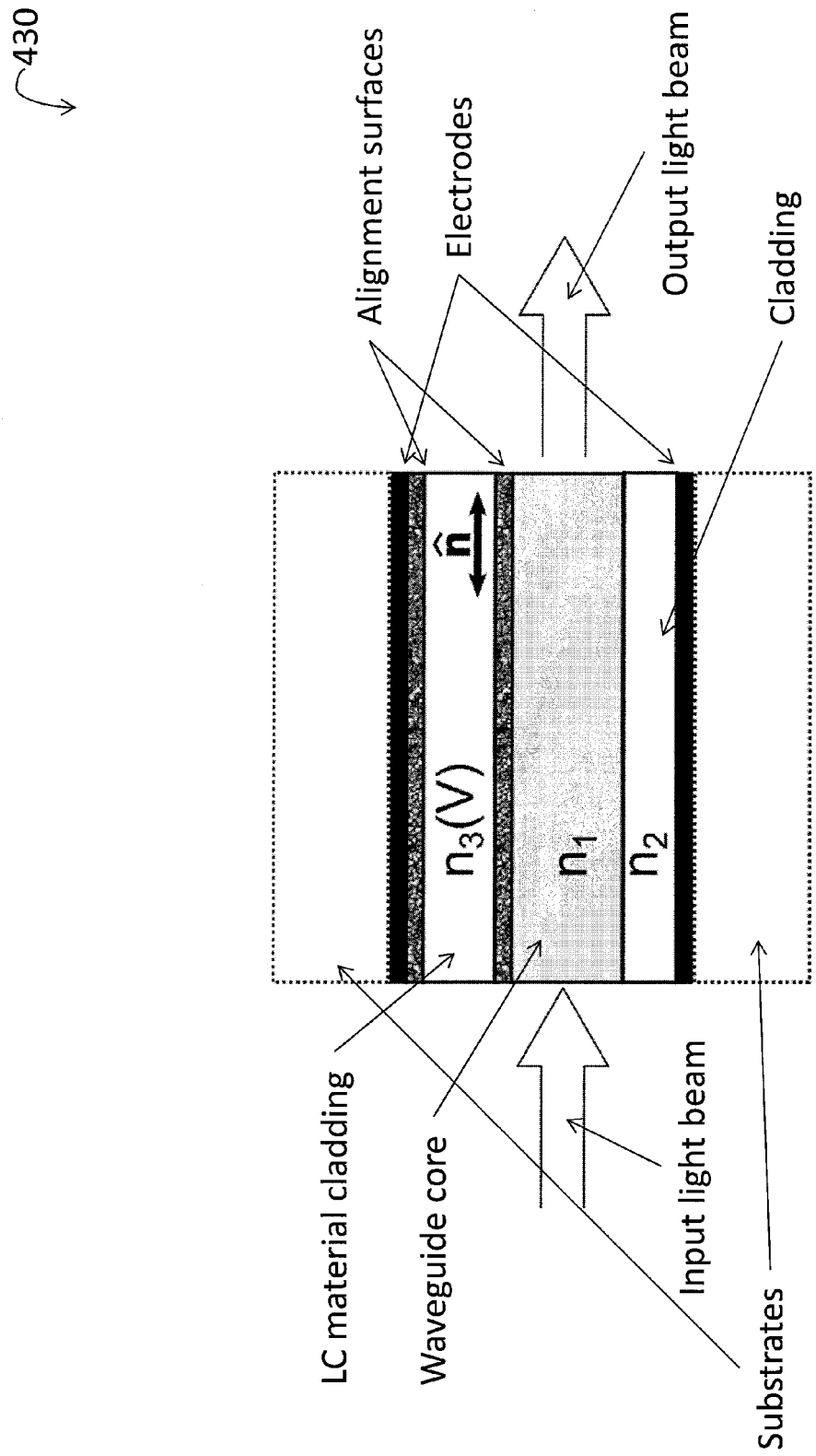
FIG. 7 is cross-sectional view of waveguide design with negative dielectric anisotropy Δ∈<0 LC used as cladding according to one embodiment.

With reference to FIG. 7, a beam of light may propagate through a core of a waveguide with refractive index $n_{core}$. One may use LC as material for at least one of the claddings around the core. Using an electric or magnetic field one changes the refractive index of the LC in the cladding without reorienting LC director, thus the state of light propagating in the core will be changed.

Figure 8:
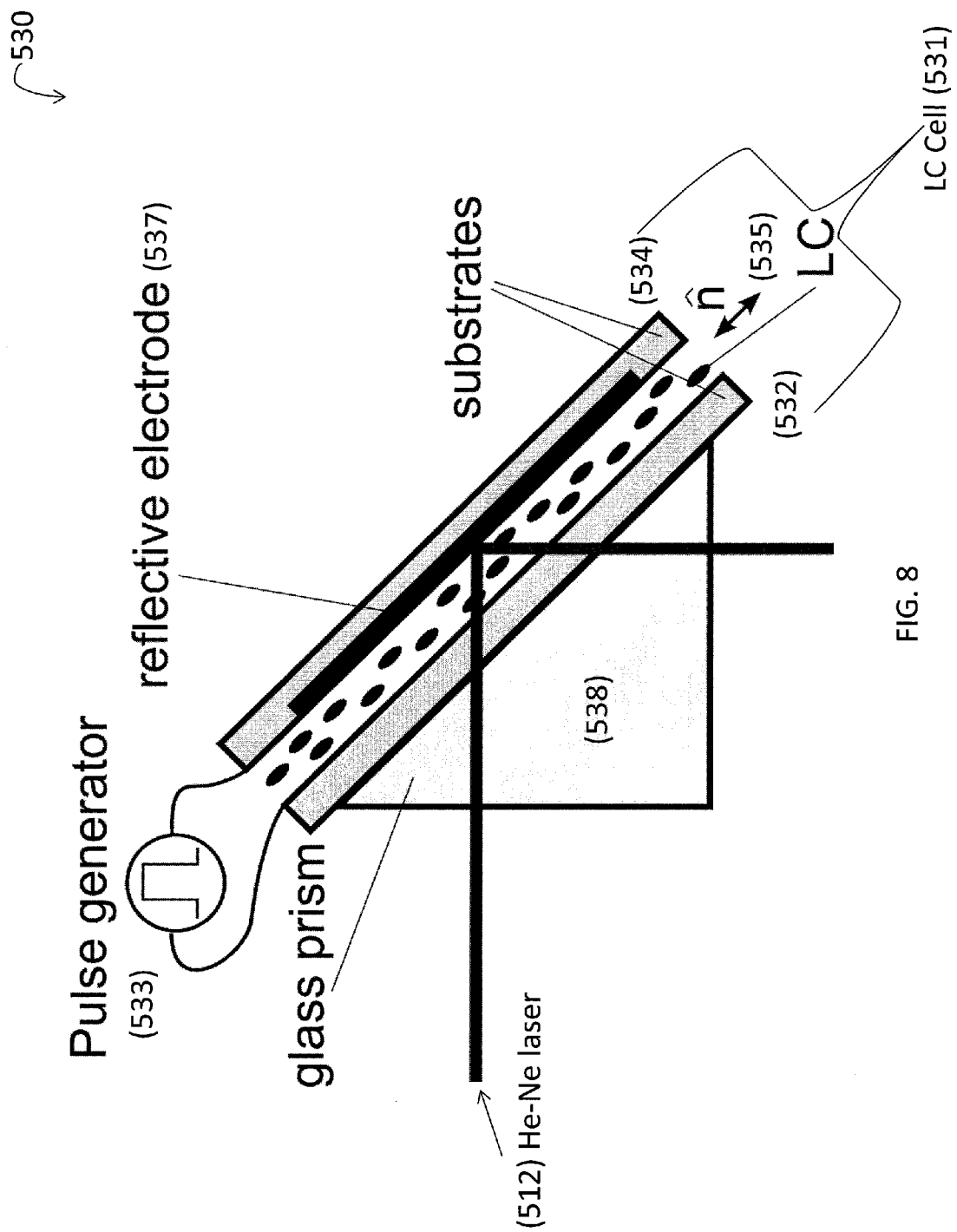
FIG. 8 is an illustration of a 45 degree LC holder according to a fifth exemplary embodiment including a single glass prism and a reflective electrode for extending the optical path of the laser.
Figure 9:
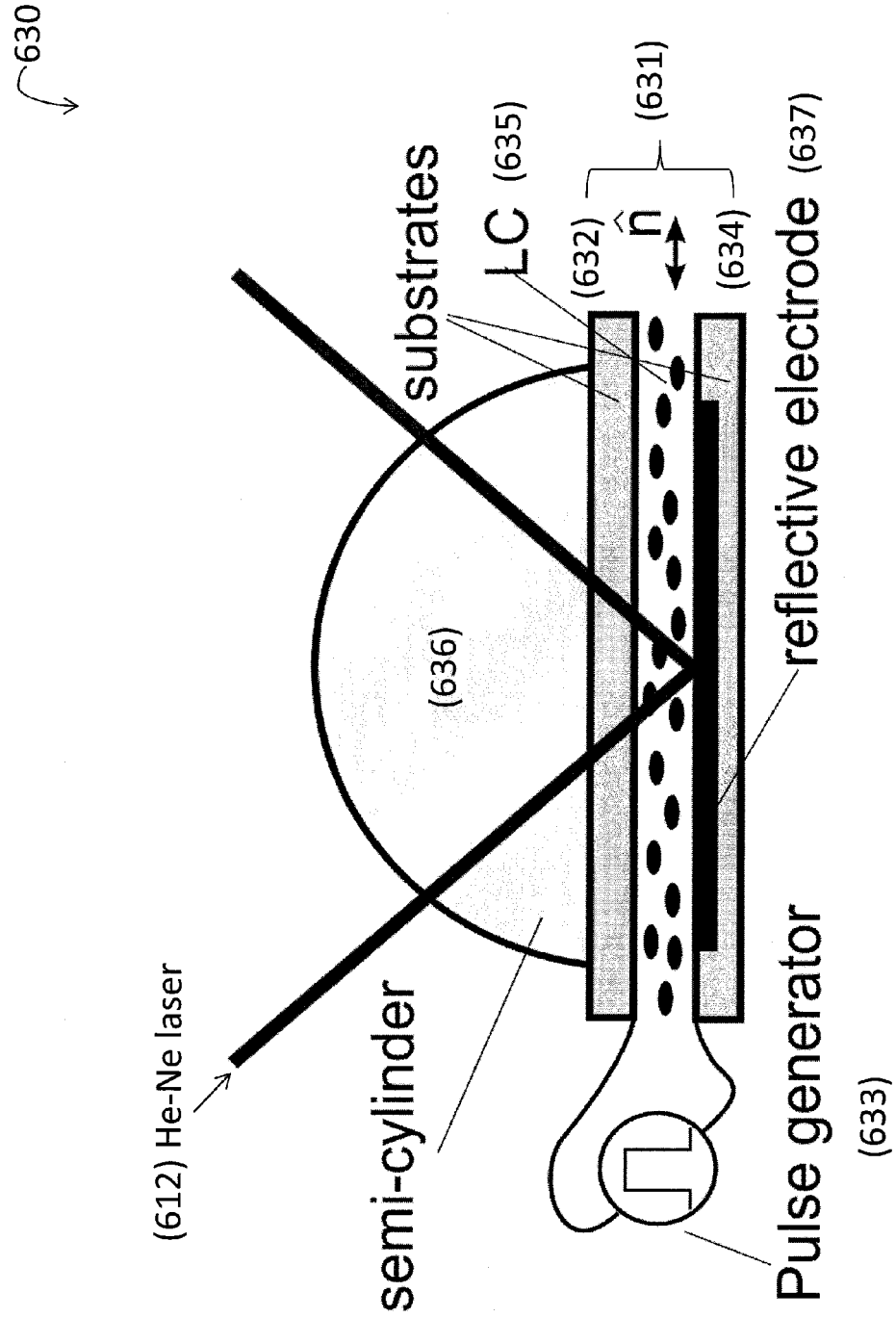
FIG. 9 is an illustration of an LC holder according to a sixth exemplary embodiment including a single semi-cylinder and a reflective electrode for extending the path of the laser.
Figure 10:
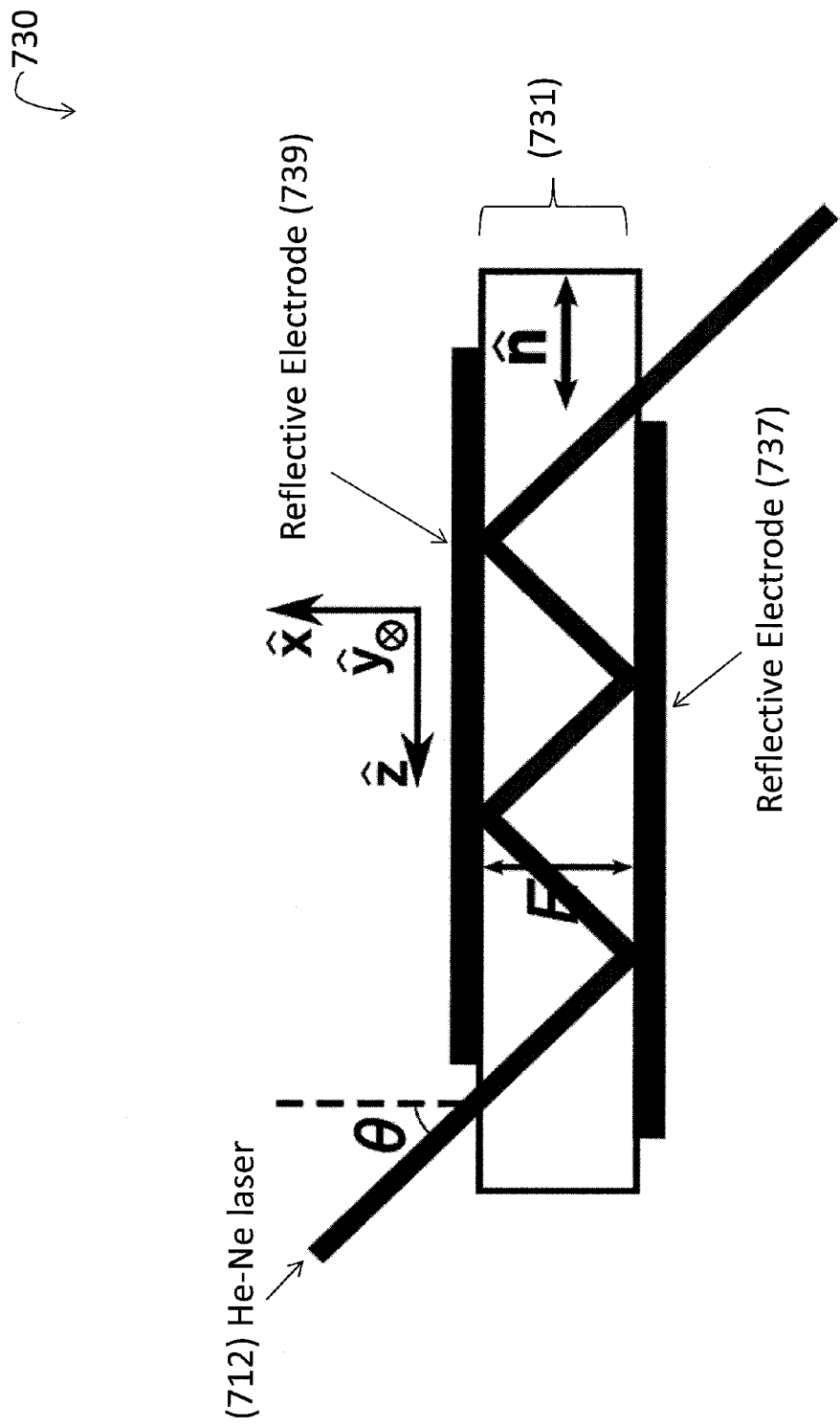
FIG. 10 is an illustration of an LC holder according to a seventh exemplary embodiment including two reflective electrodes for extending the path of the laser.

As demonstrated in FIGS. 8, 9, and 10, a multiple reflection of a light beam extends the optical length, thus increasing the field-induced phase retardation generated by the nanosecond electro-optic modulator device.

With reference to FIG. 8, a 45 degree holder 530 according to a fifth exemplary embodiment includes an LC cell 531 including two opposite substrates 532, 534 which surround LC material 535. The substrates 532, 534 are electrically connected by a pulse generator 533. The substrates 532, 534 are held at an approximately 45 degree angle, and a triangular prism 538 again compensates for refractive effects at the substrate/ambient interface.

Substrate 534 includes a reflective electrode 537. A He—Ne laser beam 512 is projected onto the LC material 535 at an oblique angle, and then reflected by the reflective electrode 537, also at an oblique angle. This reflection of the laser 512 by the reflective electrode 537 increases the optical path length of the LC cell 531.

With reference to FIG. 9, an LC holder 630 according to a sixth exemplary embodiment includes an LC cell 631 including two opposite substrates 632, 634 which surround LC material 635. The substrates 632, 634 are electrically connected by a pulse generator 633. The substrate 632 includes or is in contact with a semi-spherical prism 636 again compensating for refractive effects at the substrate/ambient interface, with the spherical curvature allowing the HeNe laser beam 612 to be applied at an arbitrary angle-of-incidence.

Substrate 634 includes a reflective electrode 637. A He—Ne laser beam 612 is projected onto the LC material 635 at an oblique angle through the spherical prism 636 and substrate 632, and then reflected by the reflective electrode 637, also at an oblique angle. This reflection of the laser beam 612 by the reflective electrode 637 increases the optical path length of the LC cell 631.

With reference to FIG. 10, an LC holder 730 according to a sixth exemplary embodiment includes an LC cell 731 including two opposite reflective electrodes 737, 739 which surround LC material. A He—Ne laser beam 712 is projected onto the LC material at an oblique angle, and then reflected multiple times between the reflective electrodes 737, 739 at an oblique angle. More generally, one or more reflections may occur between the reflective electrodes 737, 739. This reflection or reflections of the laser 712 by the reflective electrodes 737, 739 increases the optical path length of the LC cell 731.

Figure 11:
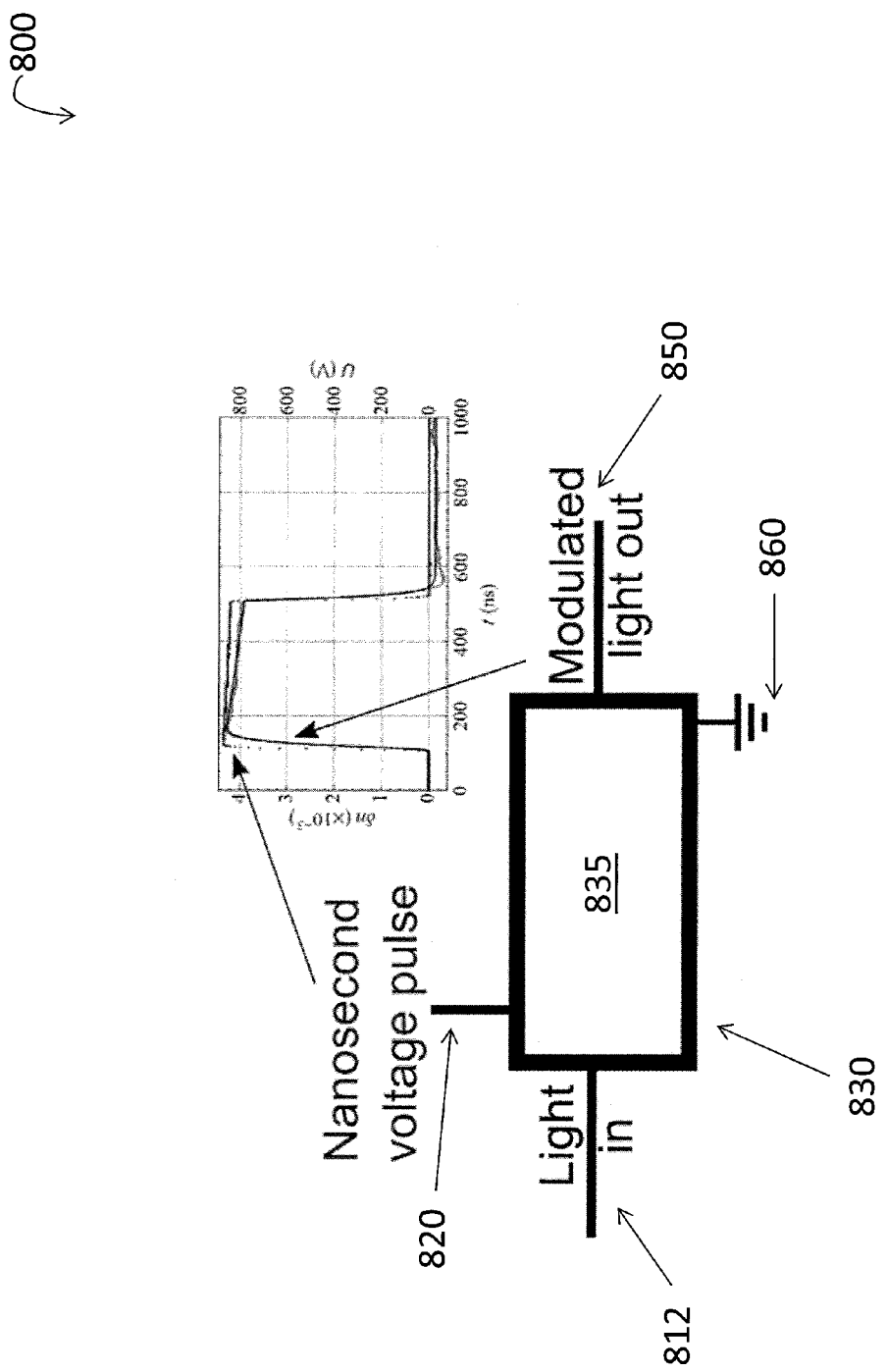
FIG. 11 is an illustration of an optical modulating device according to a first exemplary embodiment.

With reference to FIG. 11, an optical modulating device 800 according to a first exemplary embodiment includes an input light 812, a modulating voltage source 820, a modulated light output 850, and an electrical ground 860. A holder/housing 830 includes LC material 835 and (for an LC material with negative dielectric anisotropy) suitably has a configuration such as one shown in FIGS. 1 and 2 in which an electric field applied by the modulating voltage source 820 does not cause reorientation of the quiescent or unbiased direction of the LC directors. The voltage source 820 may be any suitable voltage source for providing a strong electric field, e.g. $E>10^8$ V/m, oriented so that it does not realign the director and influences only the orientational order and the spectrum of director fluctuations. This modulated light out 850 includes various continuous, or discrete, levels of optical phase retardation.

Figure 12:
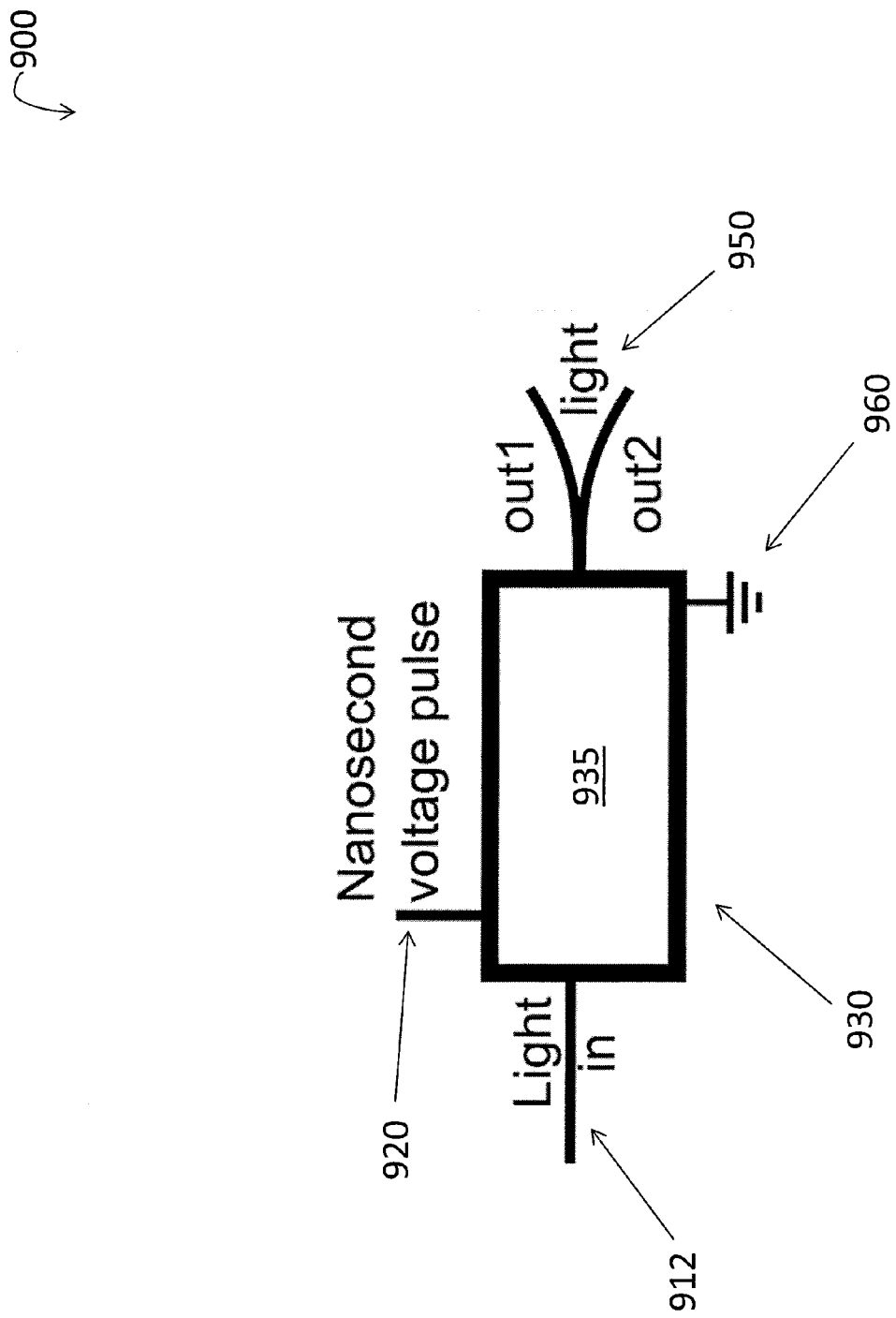
FIG. 12 is an illustration of an optical modulating device according to a second exemplary embodiment.

With reference to FIG. 12, an optical modulating device 900 according to a second exemplary embodiment includes an input light 912, a modulating voltage source 920, a binary light output 950, and an electrical ground 960. A holder/housing 930 includes LC material 935 and (for an LC material with negative dielectric anisotropy) suitably has a configuration such as one shown in FIGS. 1 and 2 in which the electric fields applied by the voltage source 820 does not cause reorientation of the quiescent or unbiased direction of the LC directors. The voltage source 920 may be any suitable voltage source for providing a strong electric field, e.g. $E>10^8$ V/m, that does not realign the director and influences only the orientational order and the spectrum of director fluctuations. The modulating voltage source 920 provides nanoseconds electric field E pulses, to affect the birefringence of the LC material 935. In one embodiment, the output light 950 depends on the binary value associated with of the modulating voltage source 920, and exits through channels 950 either "light out 1" or "light out 2." In another embodiment, more than two light channels 950 are contemplated in conjunction with nanofield electric field pulses having three or more values to direct the light into the appropriate light channel.

Figure 13:
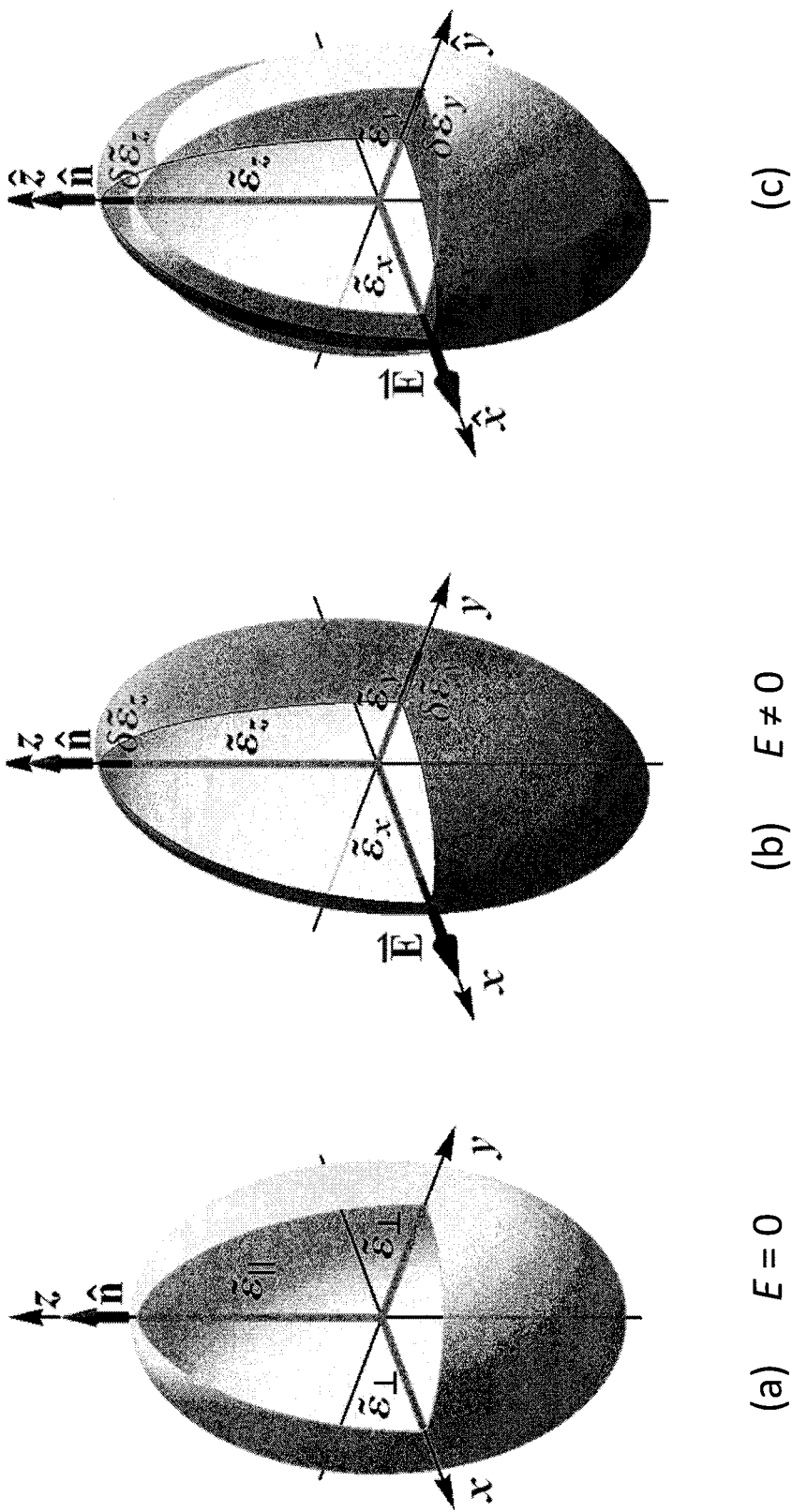
FIG. 13 is a conceptual drawing of Nanosecond Electric Modification of Order Parameter (NEMOP) of Liquid Crystals according to the uniaxial nematic case.
Figure 14:
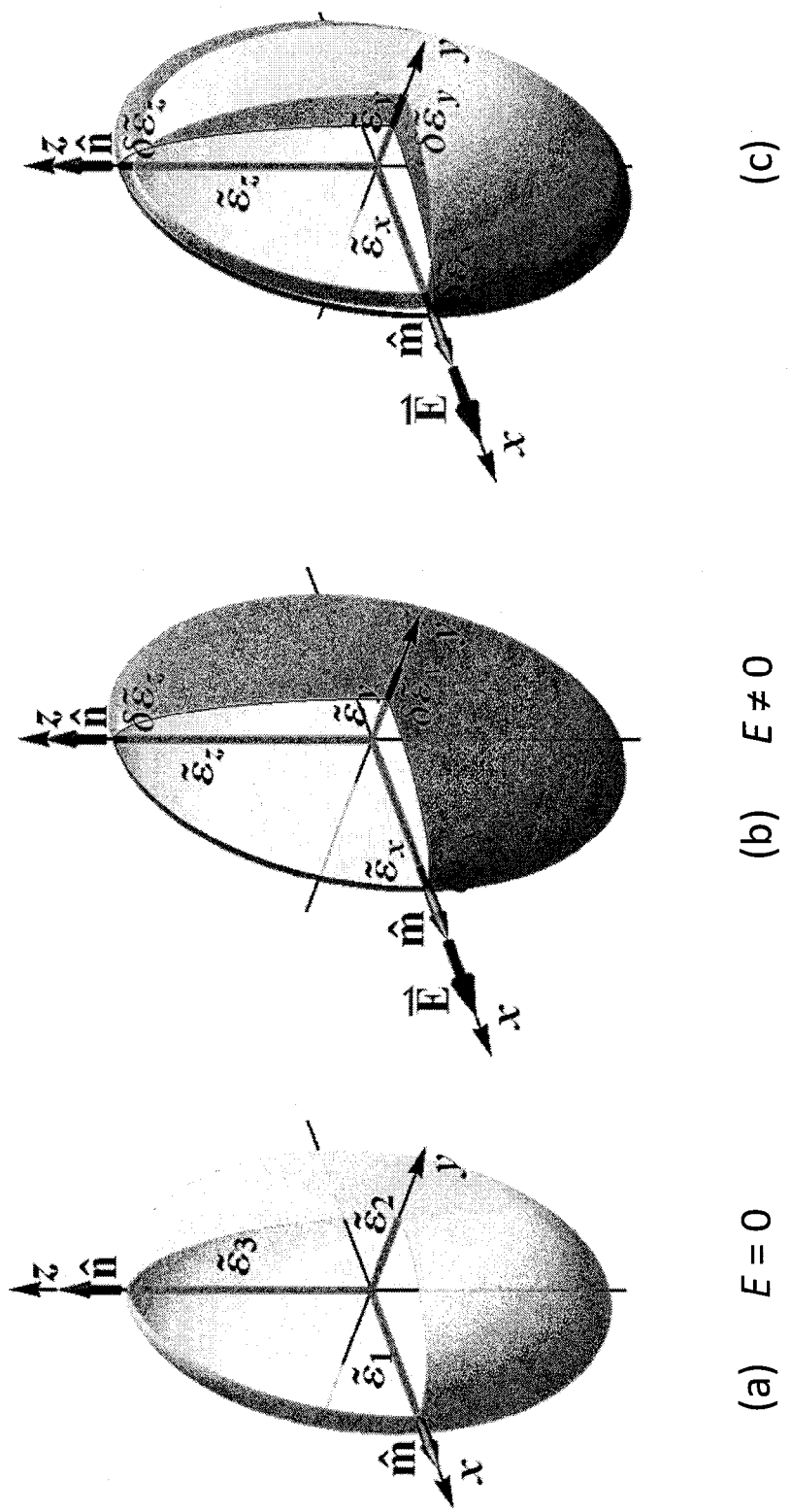
FIG. 14 is a conceptual drawing of NEMOP of Liquid Crystals according to the biaxial nematic case.

With reference to FIGS. 13 and 14, the idea of Nanosecond Electric Modification of Order Parameter (NEMOP) of Liquid Crystals is based on keeping the orientation of the LC directors at their quiescent or unbiased directions, and the electric field is used to modify the uniaxial and biaxial order parameters and fluctuations of the director (optical axis) orientation. The direction of the probing beam propagation and its polarization could be designed to achieve the desirable result, either in terms of the response time or the amplitude of switched birefringence, or both.

NEMOP could be explained using the concept of the dielectric tensor at optical frequencies (optic tensor) as shown in FIGS. 13 and 14, drawn to illustrate the cases of uniaxial nematic and biaxial nematic, respectively. In both cases, the applied electric field does not reorient the axes of the ellipsoid, but it does modify the length of these axes to produce a field-induced change in birefringence.

With reference to FIG. 13, the (a) uniaxial phase in a field-off state is represented by ellipsoid of revolution with two principal components of optic tensor: transverse components (both equal to $\tilde{\epsilon}_\perp = n_o^2$) and longitudinal component $\tilde{\epsilon}_\| = n_e^2$. The average orientation of the long molecular axes is shown as a primary director n̂. The (b) NEMOP effect can be explained by how an electric field E along the x-axis changes the optic tensor principal values by $\delta\tilde{\epsilon}_x$, $\delta\tilde{\epsilon}_y$, and $\delta\tilde{\epsilon}_z$. Field-induced biaxial phase is represented by generalized ellipsoid with new principal components of optic tensor $\tilde{\epsilon}_x$, $\tilde{\epsilon}_y$, and $\tilde{\epsilon}_x$. The (c) field-off and field-on optical ellipsoids are shown together for comparison.

With reference to FIG. 14, the (a) field-off biaxial nematic state is represented by generalized ellipsoid. The average orientation of the long molecular axes is shown as a primary director n̂, and the average orientation of the secondary molecular axes is shown by a secondary director m̂. Principal components of optic tensor in field-off state are $\tilde{\epsilon}_x$, $\tilde{\epsilon}_y$, and $\tilde{\epsilon}_x$. The NEMOP effect can be described by how electric field E applied along the x-axis does not change orientation of the primary and secondarily directors, but it does modify $\tilde{\epsilon}_x$, $\tilde{\epsilon}_y$, and $\tilde{\epsilon}_x$ by $\delta\tilde{\epsilon}_x$, $\delta\tilde{\epsilon}_y$, and $\delta\tilde{\epsilon}_z$ respectively. The new values of principal components of optic tensor in field-enhanced biaxial state are $\tilde{\epsilon}_x$, $\tilde{\epsilon}_y$, and $\tilde{\epsilon}_x$. The (c) field-off and field-on optical ellipsoids are shown together for comparison.

Further disclosure is provided in the form of the following examples. The examples provided are merely representative of the work that contributes to the teaching of the present disclosure.

EXAMPLE 1

Nanosecond Electrooptic Response of Thermotropic Nematic Liquid Crystal

With reference to FIG. 3, a system for detecting or measuring optical response signals from a liquid crystal includes a helium-neon (HeNe λ=632.8 nm) laser generator. The generator produces a He—Ne laser beam which is first projected onto a linear polarizer. The laser beam then travels to the core working unit. The main element of this core working unit is a LC slab that is addressable by an electric field. In this example, the LC is a uniaxial nematic, formed by the molecules of 4'-butyl-4-heptyl-bicyclohexyl-4-carbonitrile (CCN-47) (Nematel GmbH) with negative anisotropy of dielectric permittivity, $\Delta\varepsilon=-5.1$ at field frequencies f=(1-50) kHz.

The material is in the nematic phase and the birefringence is $\Delta n=0.027$ at the temperature of 45° C., at which the experiment in Example 1 was performed. The temperature control was provided by a Linkam hot stage (LTS350) connected to a Linkam controller (TMS94). The LC is confined between two glass plates of thickness 1.1 mm with the inner surfaces containing layers of indium tin oxide (ITO) conductive transparent electrodes. Another element of the working unit might be optical devices such as two prisms at the opposite sides of the flat LC cell shown in FIGS. 3 and 4.

These two prisms provide an oblique incidence of the laser beam, with the angle of incidence $\theta$ being approximately 45 degrees. The polarization direction of the laser beam makes an angle $\beta=45$ degree with the incidence plane of the LC slab. See FIGS. 3 and 4. The cell is oriented in such way that the LC director $\hat{n}$ is in the incidence plane of a probing beam (as shown on FIG. 4). The laser beam travels through the LC cell, Soleil-Babinet compensator, and an analyzer crossed with the polarizer. Lastly, the optical response from the liquid crystal is detected by a fast detector.

In the geometry discussed in this example, the laser beam has an incidence angle $\theta=45$ degree and the polarization angle $\beta=45$ degree, as specified above. The reason is that in this geometry, the electrically induced changes in the spectrum of director fluctuations do not contribute to the modification of the properties of the beam passing through the LC. On the other hand, the electrically induced changes of the orientational order modify the effective birefringence of the LC. As a result, the optical signal measured after the beam passes through the core working unit and a pair of crossed polarizers, changes in response to the electric field applied to the LC cell. Note that the selection of angle $\beta=45$ degree allows one to maximize the depth of optical modulation, as the transmitted intensity of light is proportional to $\sin^2 2\beta$.

In FIG. 4, the electrode area of the LC cell is rather small, $A=3\times3$ mm$^2$; the two ITO electrodes are separated by a gap $d=4.2$ μm. A low resistivity ITO was used (10 Ω/sq). This allows RC-time of the cell to be around $\tau_{RC}=7$ ns. The ITO electrodes of the cell were coated with a unidirectionally rubbed alignment layer of polyimide PI-2555, commercially available from HD MicroSystems. The cells are assembled from two glass plates rubbed in the directions parallel to each other.

Figure 15:
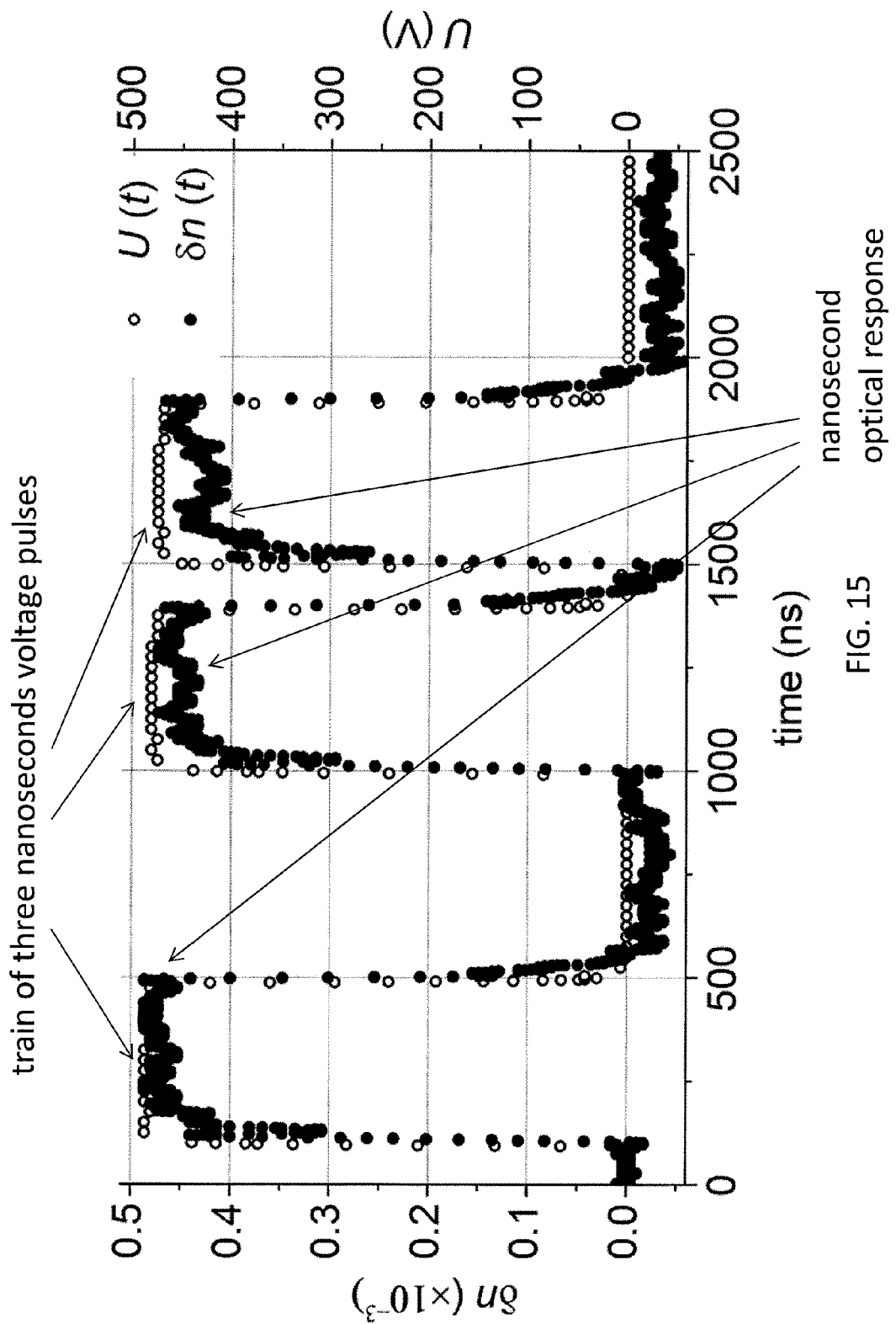
FIG. 15 is a graph of a train of three voltage pulses (open circles) and the nanosecond optical response of CCN-47 (filled circles).

The nanosecond optic response of the assembly to the short voltage pulses is illustrated in FIG. 15. The electric field pulses applied across the LC slab perpendicularly to the director, do not realign the director (since $\Delta\varepsilon<0$), but change the degree of orientational order and the effective birefringence of the LC material. FIG. 15 shows a train of three voltage pulses of an amplitude 480 V and duration 370 ns each (the voltage profile is traced by open circles in FIG. 15) and the nanosecond optical response to these pulses, presented as a change in the birefringence (traced by closed circles in FIG. 15) of the LC slab. The values of the field-induced birefringence δn were obtained measuring (with a photodetector with response time<1 ns) the light intensity of the beam passed through the working unit and a pair of crossed polarizers, using the relationship $$I(t) = I_0 \sin^2 2\beta \sin^2\left[\frac{\pi \delta n(t) \overline{d}}{\lambda} + \frac{\phi_0}{2} + \frac{\phi_{SB}}{2}\right],$$

where $\overline{d}=\sqrt{2}d$ is the effective pathway of light in the cell, $\phi_0$ is the zero-field optical phase retardance of the LC slab, $\phi_{SB}$ is the adjustable phase of the Soleil-Babinet compensator.

A standard definition of response times was employed, $\tau_{ON}$ and $\tau_{OFF}$, for field-on and field-off switching respectively, as times for transmittance change between 10% and 90% under crossed polarizers. In FIG. 15, the response times are equal and short, $\tau_{ON}=\tau_{OFF}=35$ ns.

As clearly seen in FIG. 15, the response time of the LC birefringence to the applied electric field is very fast, less than 100 ns, for both field on and field off switching. There is also no memory effect, as the birefringence relaxes completely during the time between two consecutive voltage pulses.

EXAMPLE 2

Nanosecond Electrooptic Response of Thermotropic Smectic A Liquid Crystal

Example 2 was conducted similarly to Example 1, except that the liquid crystal was kept at the temperature T=21° C., at which the CCN-47 material is in the Smectic A phase. In addition to the uniaxial orientational order characterized by the director $\hat{n}$, Smectic A also shows a periodic modulation of density along $\hat{n}$. The essence of the field-induced nanosecond changes of the order remains similar to the effect described for the nematic phase of this compound in Example 1.

For this Example 2, the electrode area of the LC cell is $A=2\times2$ mm$^2$ and the two ITO electrodes are separated by a gap $d=4.7$ μm. The RC-time of the cell is around $\tau_{RC}=3$ ns.

Figure 16:
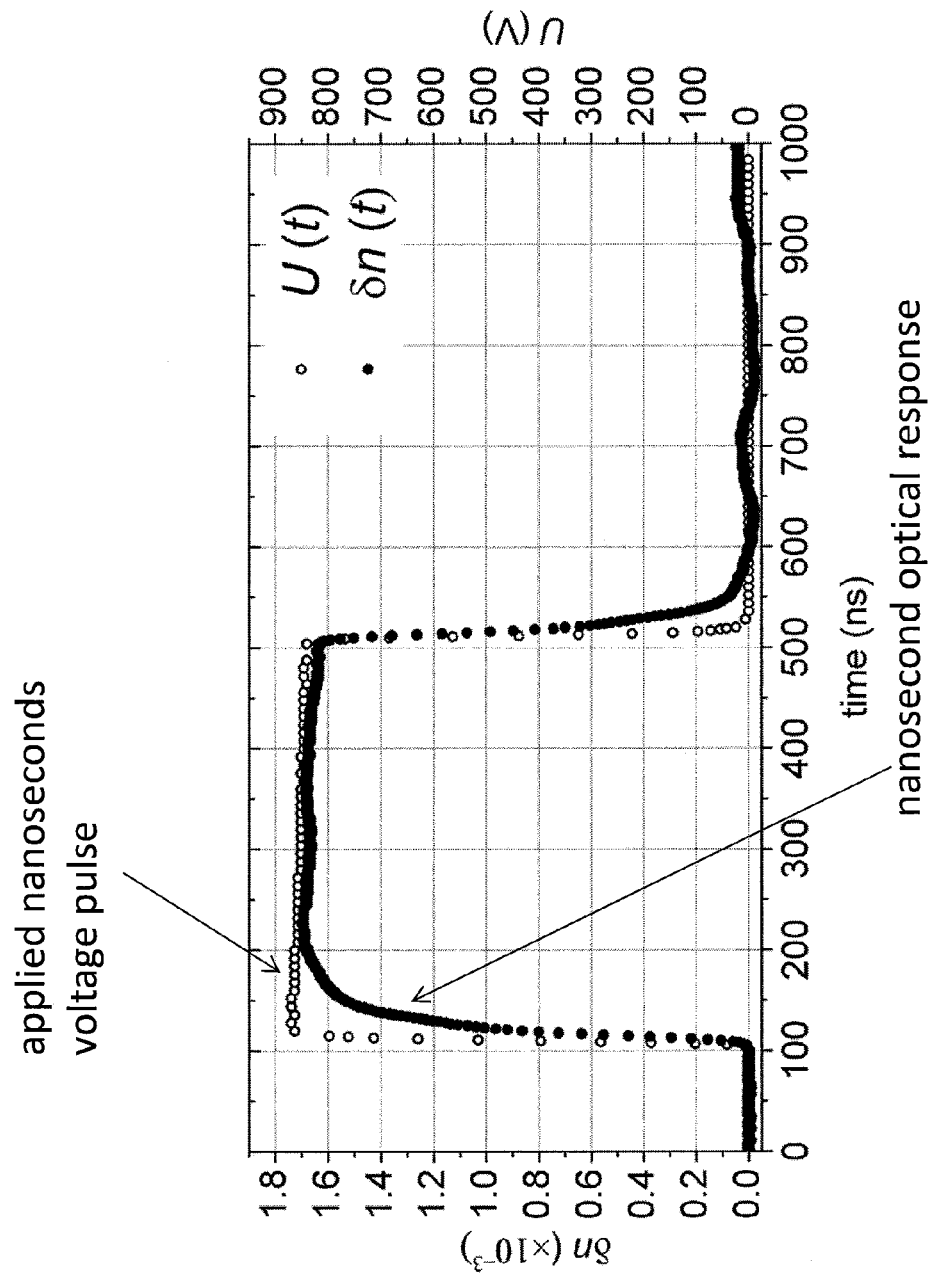
FIG. 16 is a graph of an applied voltage pulse (open circles) and nanosecond optical response of CCN-47 in Smectic A phase (filled circles).

As illustrated in FIG. 16, the change in birefringence of the smectic A phase to a single voltage pulse of amplitude 873 V is very fast, with $\tau_{ON}=39$ ns and $\tau_{OFF}=32$ ns to field on and field off respectively. There is no contribution of the director fluctuations in the described experimental geometry.

EXAMPLE 3

Large Nanosecond Electrooptic Response of Thermotropic Nematic Liquid Crystal Mixture HNG715600-100

Example 3 was conducted similarly to Examples 1 and 2, except that the liquid crystal represents a commercially available mixture HNG715600-100 purchased from Jiangsu Hecheng Display Technology. The material is in the uniaxial nematic phase at the temperature of 21° C., at which the experiment in Example 3 was performed.

The dielectric anisotropy is negative, $\Delta\varepsilon=-12.2$ at 1 kHz and birefringence $\Delta n=0.153$ at 589 nm measured at 20° C. [manufacturer's datasheet]. In this Example 3, the electrode area of the LC cell is $A=2\times2$ mm$^2$ and the two ITO electrodes are separated by a gap $d=5.1$ μm.

Figure 19:
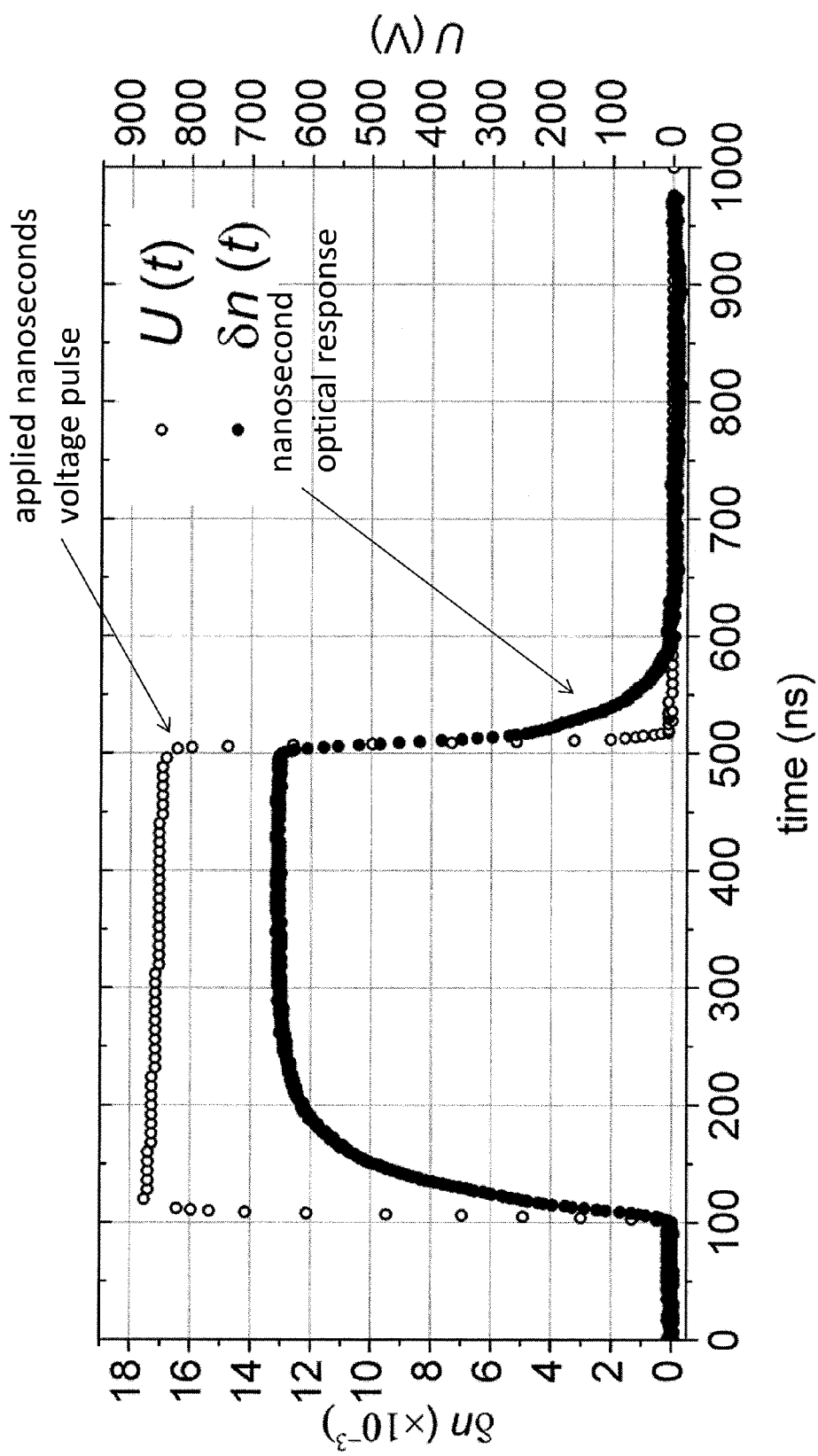
FIG. 19 is a graph of an applied voltage pulse (open circles) and nanosecond optical response of HNG715600-100 (filled circles).

With reference to FIG. 19, the material HNG715600-100 shows a nanosecond-fast change in effective birefringence when acted upon by a single voltage pulse $U_0=873$ V. The values of field induced birefringence are one order of magnitude higher than in Examples 1 and 2 for pure CCN-47, namely, $\delta n \sim 10^{-2}$, FIG. 19. The rise and fall times are $\tau_{ON}=75$ ns and $\tau_{OFF}=52$ ns correspondingly. As it can be seen on FIG. 19, the field-induced birefringence in the nanosecond optical response of HNG715600-100 is one order of magnitude higher than in the optical response of CCN-47 in Examples 1 and 2.

EXAMPLE 4

Fast Nanosecond Electrooptic Response of the Thermotropic Nematic Liquid Crystal Mixture MLC-2080

Example 4 was conducted similarly to Examples 1, 2, and 3, except that the liquid crystal represents a commercially available mixture MLC-2080 purchased from Merck (Japan). The material is in the uniaxial nematic phase at 21° C., at which the experiment in Example 4 was performed.

The dielectric anisotropy is negative, $\Delta\in=-6.4$ at 1 kHz and birefringence $\Delta n=0.11$ at 589 nm measured at 20° C. [manufacturer's datasheet]. For this Example 4, the electrode area of the LC cell is $A=2\times 2$ mm$^2$ and the two ITO electrodes are separated by a gap d=4.5 μm.

Figure 20:
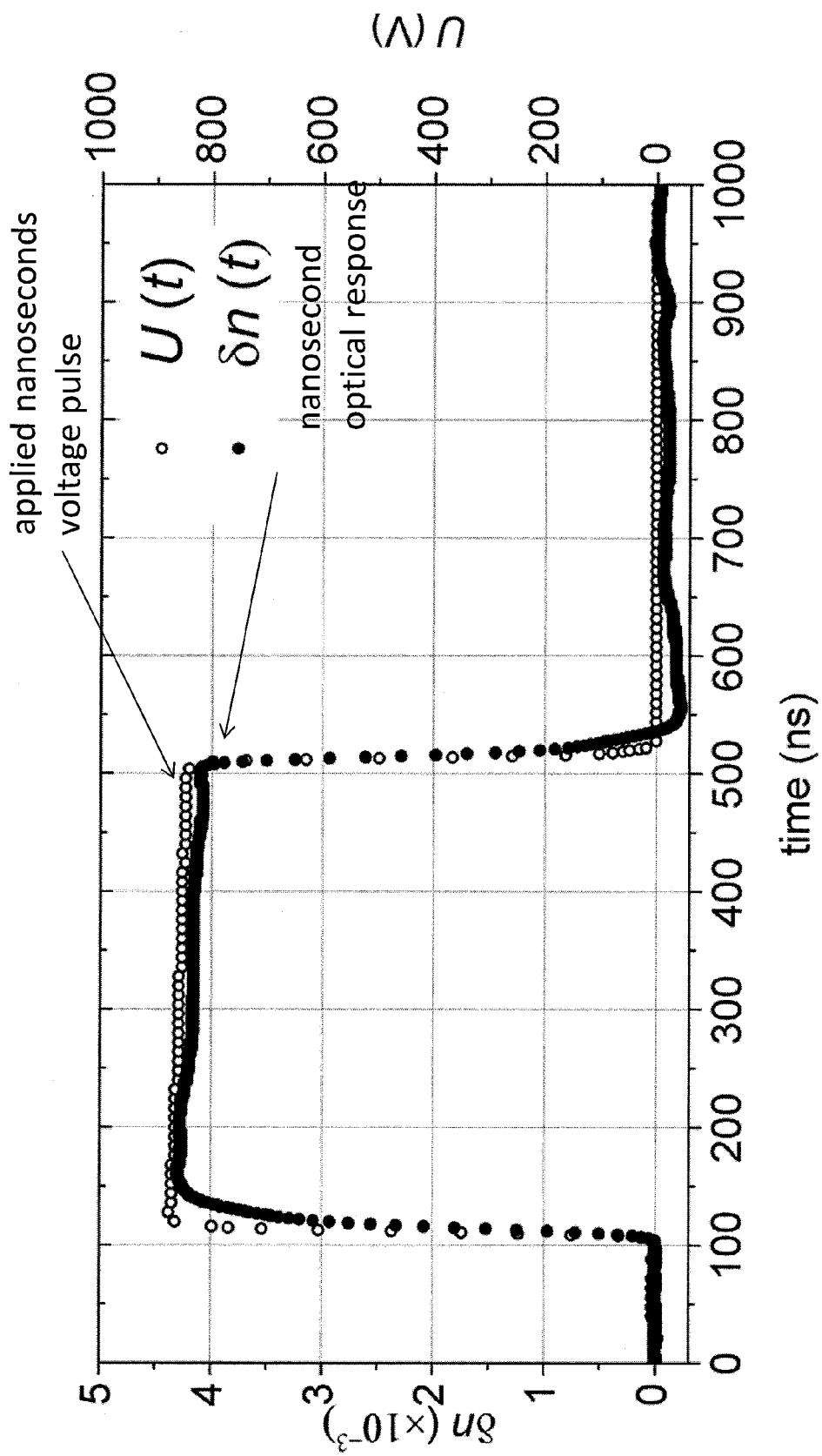
FIG. 20 is a graph of an applied voltage pulse (open circles) and nanosecond optical response of MLC-2080 (filled circles).

With reference to FIG. 20, the material MLC-2080 shows a nanosecond-fast change in effective birefringence when acted upon by a single voltage pulse $U_0=873$ V. The optical response of MLC-2080 is faster than demonstrated by CCN-47 and HNG715600-100 in Examples 1, 2, and 3. Namely, the rise and fall times are $\tau_{ON}=23$ ns and $\tau_{OFF}=21$ ns correspondingly.

EXAMPLE 5

Nanosecond Electrooptic Response of Thermotropic Nematic Liquid Crystal with Positive Dielectric Anisotropy in Planar Geometry Example 5 was conducted similarly to Examples 1, 2, 3, and 4, except that we used a nematic LC 4-Cyano-4'-pentylbiphenyl (5CB) with positive dielectric anisotropy $\Delta\in=13$ measured at f=1 kHz at 25° C. The material was purchased from Jiangsu Hecheng Display Technology. The material is in the uniaxial nematic phase at the temperature of 22° C., at which the experiment in Example 5 was performed.

Figure 21:
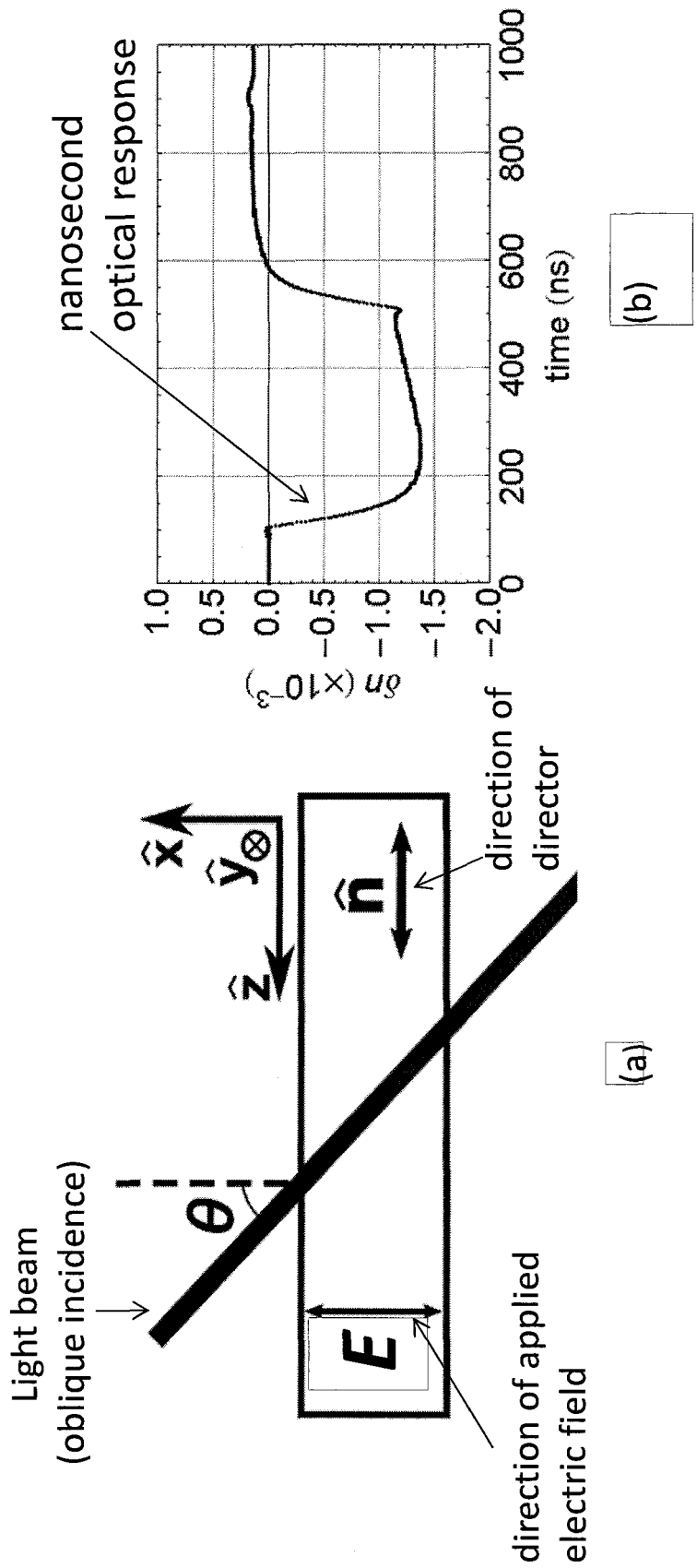
FIG. 21(*a*) is a schematic representation of experimental geometry showing the direction of light propagation, electric field, and director orientation and (b) Nanosecond optical response of 5CB in planar geometry.

For this Example 5, the electrode area of the LC cell is $A=2\times 2$ mm$^2$ and the two ITO electrodes are separated by a gap d=4.5 μm. The experimental geometry is shown in FIGS. 3 and 4, and FIG. 21(a).

Due to the dielectric memory effect, caused by the dielectric dispersion at frequencies up to 1 GHz, as taught in *Phys. Rev. E*, 76, 061702 (2007), the director orientation and the director fluctuations of materials with positive dielectric anisotropy do not considerably change within a short period of time, and these materials could be used in planar geometries in a similar way as the negative dielectric anisotropy materials described in the previous examples. Accordingly, to implement the fast optical modulation techniques disclosed herein with a positive dielectric anisotropy LC material in a planar geometry, the pulse of an applied voltage has to be short enough in order to avoid the dielectric reorientation of the director n̂.

A single voltage pulse $U_0=242$ V of duration 370 ns was applied so as to not realign the director n̂ over short period of time. In the previous Examples 1, 2, 3, and 4, the electric field increases the order parameter of LCs and results in positive field-induced birefringence δn. In this Example 5, the electric field reduces the orientational order resulting in negative value of δn. As illustrated in FIG. 21(b), a fast nanosecond negative electrooptic response was achieved, with the rise and fall times $\tau_{ON}=62$ ns and $\tau_{OFF}=94$ ns respectively.

EXAMPLE 6

Nanosecond Electrooptic Response of Thermotropic Nematic Liquid Crystal with Positive Dielectric Anisotropy in Homeotropic Geometry Example 6 was conducted similarly to Examples 1, 2, 3, 4, and 5, except that the LC cell was prepared in the cells with the so-called homeotropic alignment, in which the director is perpendicular to the bounding plates. The liquid crystal used in this example was 4-Cyano-4'-pentylbiphenyl (5CB) purchased from Jiangsu Hecheng Display Technology. The dielectric anisotropy is positive, $\Delta\in=13$. We used an alignment layer SI-1211 (Nissan Chemicals) which promotes homeotropic alignment of 5CB. For this Example 6, the electrode area of the LC cell is $A=2\times 2$ mm$^2$ and the two ITO electrodes are separated by a gap d=4.4 μm. The field is applied parallel to the director. The experimental geometry is shown in FIGS. 3, 4, and 22(a). The material is in the nematic phase at the temperature of 22° C., at which the experiment in Example 6 was performed.

For a positive dielectric anisotropy LC, an electric field applied parallel to the director does not realign the director, FIG. 22(a). However, it does change the degree of molecular ordering, which results in the nanosecond electrically-modified order parameter and corresponding change in LC birefringence. FIG. 22(b) shows the nanosecond optical response to a single voltage pulse of $U_0=791$ V. According to FIG. 22(b), the rise and fall times are $\tau_{ON}=126$ ns and $\tau_{OFF}=33$ ns respectively. As compared to Examples 1-5, 5CB in cells with homeotropic alignment yields the highest value of the field-induced birefringence δn.

EXAMPLE 7

Nanosecond Electrooptic Response of Compensated Mixtures of Positive and Negative Dielectric Anisotropy Materials Example 7 was conducted similarly to Examples 1, 2, 3, 4, 5, and 6 with reference to FIG. 3, but without two prisms at the opposite sides of the flat LC cell. The LC cell has planar alignment and is perpendicular to the probing laser beam, so that d̄=d. The ITO electrodes of the cell were coated with a unidirectionally rubbed alignment layer of polyimide PI-2555, commercially available from HD MicroSystems. The cells are assembled from two glass plates rubbed in the directions parallel to each other. The polarization direction of the laser beam makes an angle β=45 degree with the director n̂ in the LC slab.

In this example, two similar cells are used with the electrode area of the LC cell $A=2\times 2$ mm$^2$ and the two ITO electrodes separated by a gap d=4.5 μm. The cells were filled with a mixture M1 of nematic materials with positive and negative anisotropy, namely 5CB and CCN-47 in weight proportion of 25.5 wt %: 74.5 wt %. The dielectric anisotropy $\Delta\in$ of this mixture measured at 5 kHz at room temperature is close to zero, $\Delta\in=-0.17$. The mixture M1 is in the nematic phase at the temperature of 22° C., at which the experiment in Example 7 was performed.

Figure 23:
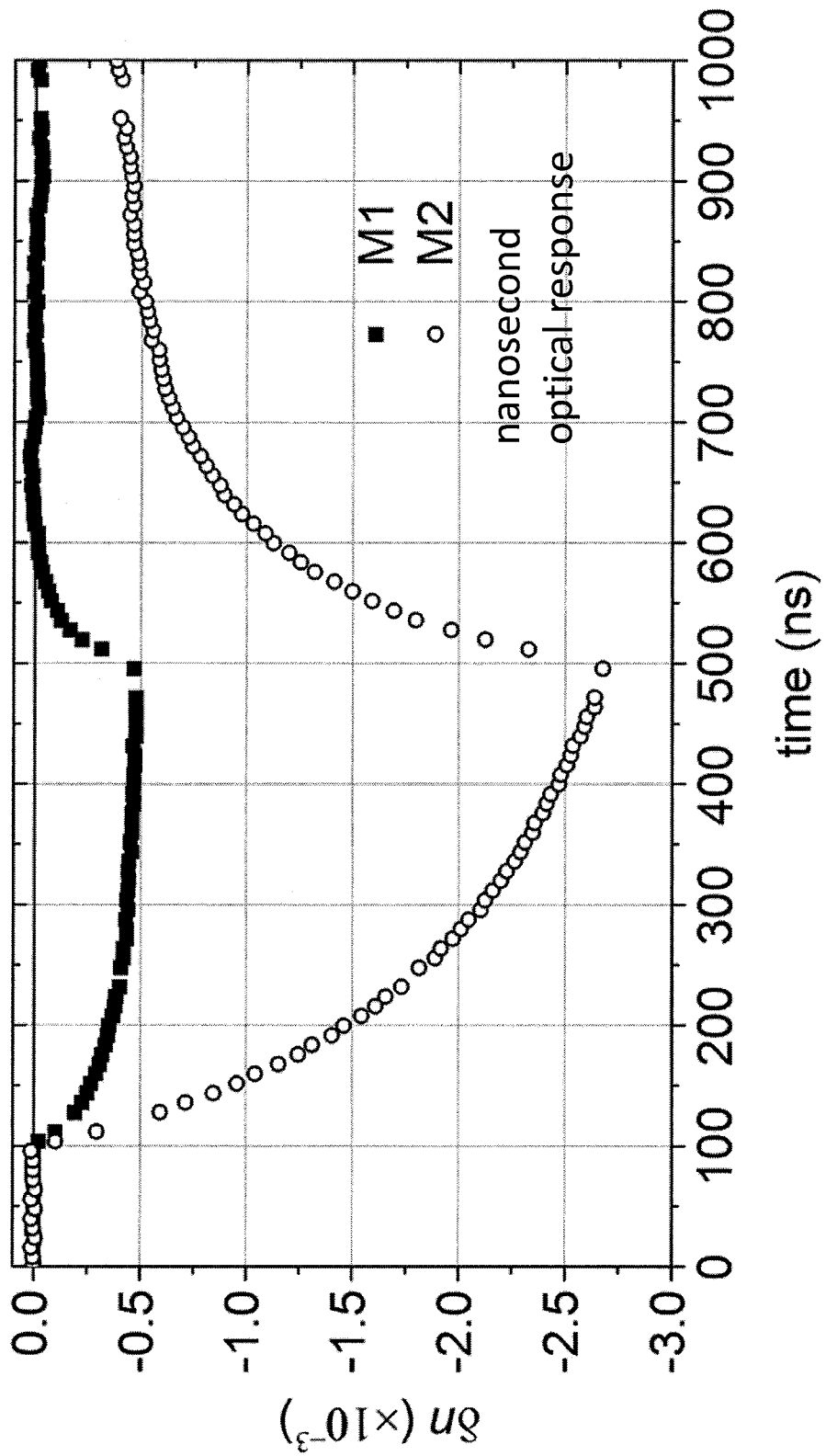
FIG. 23 is graph of nanosecond optical response for M1 (filled squares) and M2 (open circles), where M1 and M2 are compensated mixtures of positive and negative dielectric anisotropy materials.

An applied electric field does generate optical modulation via the field modified order and differential quenching of director fluctuations. FIG. 23 demonstrates the nanosecond optical response to a single voltage pulse $U_0=385$ V measured for the mixture M1, at room temperature in normal incidence geometry. Note the importance of the balance of materials in the dielectrically compensated mixture. When the cells are filled with the mixtures M2 containing 33.7 wt % of 5CB and 66.3 wt % of CCN-47 (positive dielectric anisotropy, $\Delta\varepsilon=1.08$), the optical response is very slow, as dictated by the timescales of director fluctuations. This example demonstrates that the optical set up of the LC cells with additional prisms for oblique incidence can be simplified. The oblique incidence in the case of LCs with non-zero dielectric anisotropy was used to eliminate the contribution of director fluctuations and their modifications in the electro-optic response. By creating the mixture with compensated dielectric anisotropy, one can avoid using the oblique incidence and use instead a normal incidence of the probing beam.

EXAMPLE 8

Nanosecond Electrooptic Response in Nematic and Isotropic Phases of Thermotropic Liquid Crystal with Negative Dielectric Anisotropy in Planar Geometry Example 8 was conducted similarly to Examples 1, 2, 3, 4, 5, 6, and 7. The liquid crystal used in this example was 4'-butyl-4-heptyl-bicyclohexyl-4-carbonitrile (CCN-47) purchased from Nematel GmbH. The dielectric anisotropy is negative, $\Delta\varepsilon=-5.1$ at field frequencies f=(1-50) kHz. We used an alignment layer PI-2555 (HD MicroSystems) which promotes planar alignment of CCN-47. For this Example 8, the electrode area of the LC cell is $A=2\times2$ mm$^2$ and the two ITO electrodes are separated by a gap d=4.7 μm. The field is applied normal to the director. The experimental geometry is shown in FIGS. 3 and 4. The experiment in Example 8 was conducted in the nematic and isotropic phases. The cells are assembled from two glass plates rubbed in the directions parallel to each other.

Figure 17:
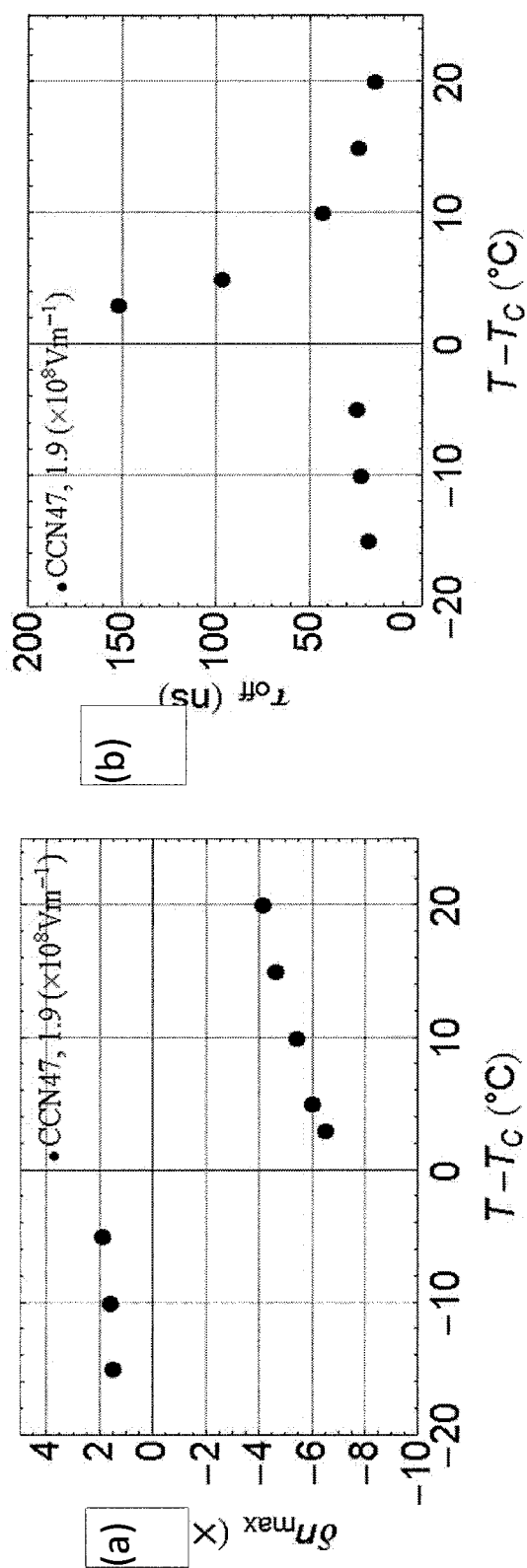
FIG. 17 is a graph of (a) Field-induced birefringence δn and (b) relaxation time $\tau_{OFF}$ in the nematic and isotropic phase of CCN-47 at applied electric field E=1.9×10$^8$ V m$^{-1}$.

FIG. 17 demonstrates that relaxation time $\tau_{OFF}$ in the nematic phase is much faster than in the isotropic, however the amplitude of the field-induced birefringence δn is several times smaller. This is still much faster than in the nematic phase of 5CB (Example 6, FIG. 22*b*) or 8CB (Example 9, FIG. 18) because in the latter case there is a slow contribution from director fluctuations quenched by the electric field.

EXAMPLE 9

Figure 22:
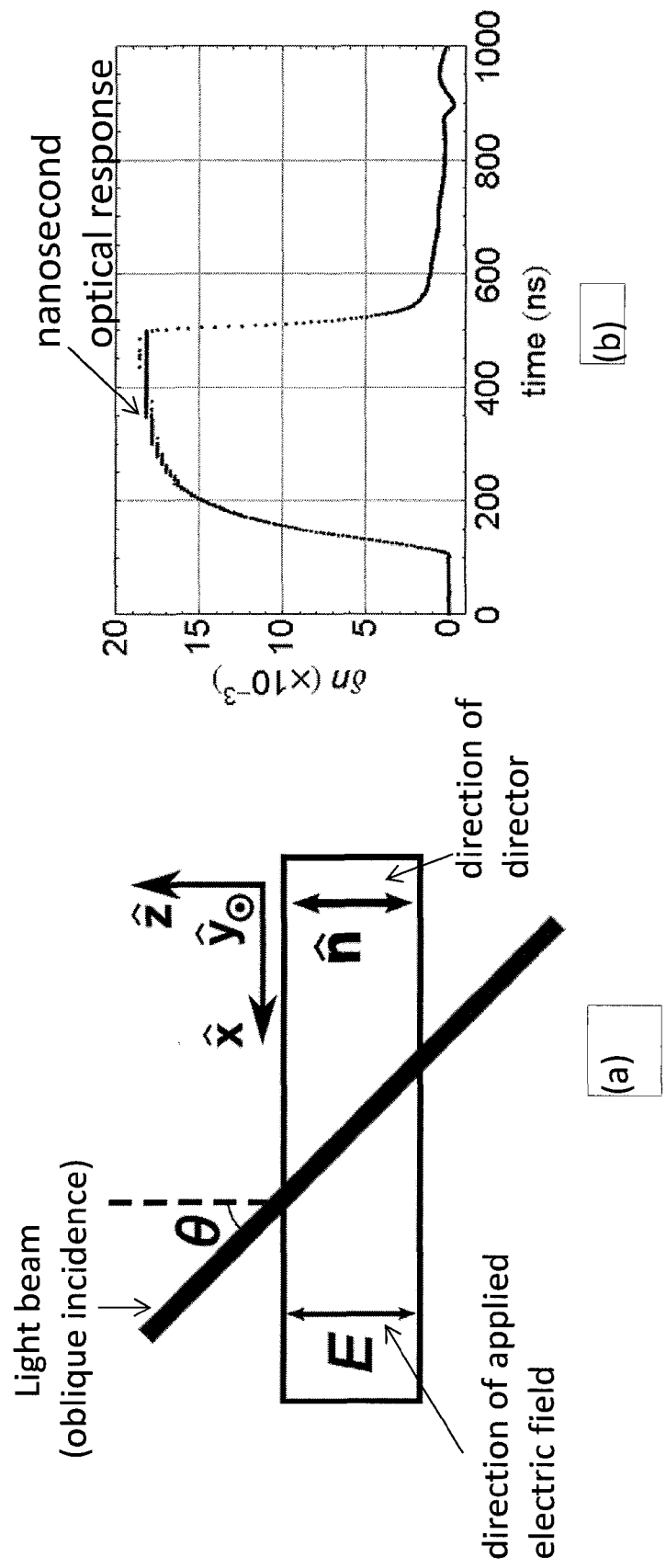
FIG. 22(*a*) is a schematic representation of experimental geometry showing the direction of light propagation, electric field, and director orientation and (b) Nanosecond optical response of 5CB in homeotropic geometry.

Nanosecond Electrooptic Response in Nematic and Isotropic Phases of Thermotropic Liquid Crystal with Positive Dielectric Anisotropy in Homeotropic Geometry This Example 9 was conducted similarly to Examples 1, 2, 3, 4, 5, 6, 7, and 8 except that the LC cell was prepared in the cells with the so-called homeotropic alignment, in which the director is perpendicular to the bounding plates. The liquid crystal used in this example was 4-n-octyl-4'-cyanobiphenyl (8CB) purchased from Merck. The dielectric anisotropy is positive, $\Delta\varepsilon=8.4$ (at 22° C.). We used an alignment layer SI-1211 (Nissan Chemicals) which promotes homeotropic alignment of 8CB. For this Example 9, the electrode area of the LC cell is $A=2\times2$ mm$^2$ and the two ITO electrodes are separated by a gap d=4.6 μm. The field is applied parallel to the director. The experimental geometry is shown in FIGS. 3, 4, and 22(*a*). The nematic-isotropic phase transition is 40.5° C. The experiment in Example 9 was performed at several temperatures in the nematic and isotropic phases.

Figure 18:
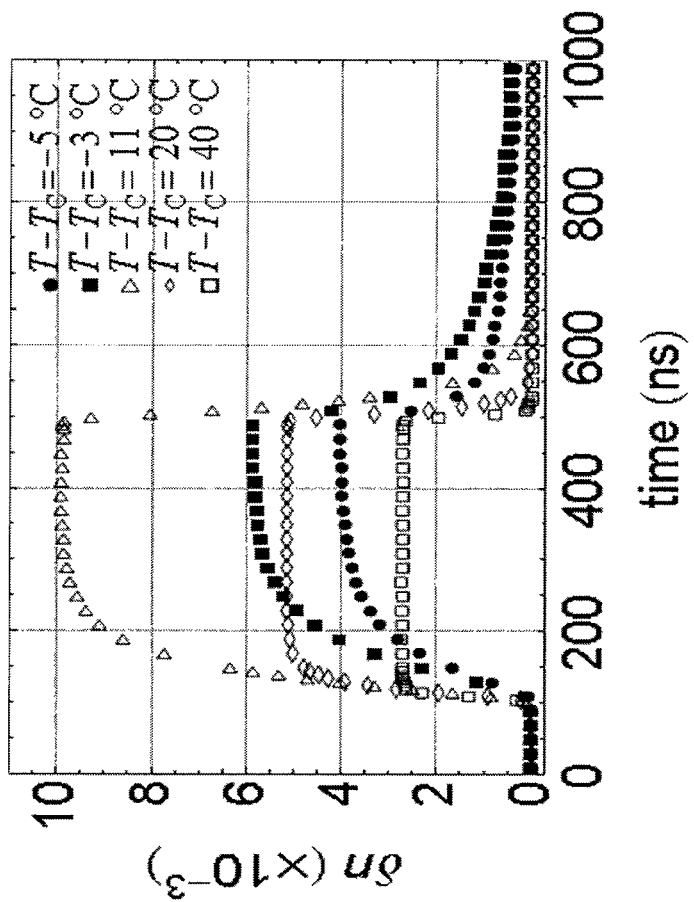
FIG. 18 is a graph of Field-induced birefringence δn in the nematic and isotropic phase of 8CB at applied electric field E=6.5×10$^7$ V m$^{-1}$.

FIG. 18 demonstrates that relaxation time $\tau_{OFF}$ in the nematic phase is much slower than in the nematic phase of the negative dielectric anisotropy materials (Example 8, FIG. 17).

EXAMPLE 10

In-Plane Switching

All previous examples deal with an electric field applied across the cell, in the direction perpendicular to the LC slab. The device configurations are not limited by this geometry. As another example, one can use in-plane switching, in which the electric field is applied parallel to the bounding glass plates. Other modes, such as fringe field addressing of dielectrically compensated LCs are also possible.

EXAMPLE 11

Implementation of NEMOP in Waveguides and Other Integrated Optical Devices

A beam of light propagates through a passive core of a waveguide with refractive index $n_{core}$. One may use LC as material for at least one of the cladding surfaces around the core, FIG. 7. Using an electric field one changes the refractive index of the LC cladding without reorienting LC director, thus the state of light and the composition of the modes propagating in the core will be influenced.

Other methods of implementing waveguide designs are contemplated, as well as other integrated optical devices, for example as specified in Chapter 8.2.4 of [L. M. Blinov and V. G. Chigrinov, *Electrooptic Effects in Liquid Crystals*, Springer, New York, 1996].

EXAMPLE 12

Photo-NEMOP Effect

Instead of the nanosecond electric pulses, one can use electric field of electromagnetic waves, e.g., visible light or infrared beams, to generate nanosecond electro-optic effect.

EXAMPLE 13

Modeling for Nanosecond Optical Response of Liquid Crystal Material

Liquid crystal materials with planar geometry such as that illustrated in the left or middle illustrative examples of FIG. 1 may be calibrated for nanosecond optical response times. An electric field E may be applied to negative dielectric anisotropy LC material, e.g. formed as an LC slab, using the voltage source 820 or the voltage source 920. In one embodiment, the applied electric field is strong, e.g. $E>10^8$ V/m.

The effects of the electric field E applied to the LC slab, particularly the optical characteristics, may be calculated. Calculating the effects may include selecting a chosen laboratory frame coupled to a planar homogeneous cell as shown in the left or middle illustrative example of FIG. 1, with a rubbing direction defining the average director orientation $\hat{n}=(0,0,1)$. The thermal fluctuations of the director at any point r are assumed to be small to second order and can be described by non-zero components: $\hat{n}(r)=(n_x(r),n_y(r),1)$.

For negative dielectric anisotropy $\Delta\varepsilon=\varepsilon_\parallel-\varepsilon_\perp<0$ in the LC materials and the geometry of the left or middle illustrative example of FIG. 1, the electric field applied across the planar cell is suitably oriented normal to the substrates and can be written as E=(E,0,0), and does not reorient the director n̂ because the negative anisotropy means that the field E=(E,0,0) tends to push the directors into the plane, that is, reinforces the director orientation n̂=(0,0,1).

However, the electric field E=(E,0,0) modifies the uniaxial orientational order of the LC and induces the biaxial order. The induced biaxial order is referred to herein as field-induced biaxial order. Apart from the order parameter effects, the applied electric field also suppresses the thermal fluctuations of the director n̂ in the xz-plane, but hardly affects the fluctuations in the yz-plane. It also affects the perceived (apparent) effective birefringence. See D. Dunmur, P. Palffy-Muhoray, *J. Phys. Chem.* 92, 1406, 1988.

Neglecting small pretilt angles, under the applied electric field, calculating the effects of the electric field E applied to the LC slab may further include calculating the eigenvalues of the dielectric permittivity tensor $\hat{\epsilon}$ on the optical frequencies (optic tensor) according to EQN. 1:

$$\varepsilon_x = \varepsilon_\perp + \frac{\delta\varepsilon_b}{2} - \frac{\delta\varepsilon_u}{3} + \langle n_x^2 \rangle (\varepsilon_\parallel - \varepsilon_\perp) \quad \text{(EQN. 1)}$$

$$\varepsilon_y = \varepsilon_\perp - \frac{\delta\varepsilon_b}{2} - \frac{\delta\varepsilon_u}{3} + \langle n_y^2 \rangle (\varepsilon_\parallel - \varepsilon_\perp)$$

$$\varepsilon_z = \varepsilon_\parallel + \frac{2\delta\varepsilon_u}{2} - (\langle n_x^2 \rangle + \langle n_y^2 \rangle)(\varepsilon_\parallel - \varepsilon_\perp),$$

where $\epsilon_\perp$ and $\epsilon_\parallel$ are the diagonal elements of the local dielectric tensor; $\delta\epsilon_u$ and $\delta\epsilon_b$ are the variations of the dielectric tensor elements corresponding to the field-induced uniaxial and biaxial order parameter changes; $\langle n_x^2 \rangle$ and $\langle n_y^2 \rangle$ are the mean squared amplitudes of the director fluctuations along the x- and y-axes.

The dynamics of the uniaxial and biaxial order parameters can be modeled according to EQNs 2(a) and 2(b) by the Landau-Khalatnikov approach. See L. Landau, I. Khalatnikov, *Dokl. Akad. Nauk. SSSR*, 96, 469, 1954]:

$$\tau_{u,b} \frac{d\delta\varepsilon_{u,b}(t)}{dt} = \alpha_{u,b} E^2(t) - \delta\varepsilon_{u,b}(t) \quad \text{(EQN. 2a)}$$

$$\delta\varepsilon_{u,b}(t) = \int_0^t \frac{\alpha_{u,b} E^2(t')}{\tau_{u,b}} e^{\frac{-(t-t')}{\tau_{u,b}}} dt', \quad \text{(EQN. 2b)}$$

where $\alpha_u$ and $\alpha_b$ are the susceptibilities of the uniaxial and biaxial order parameters to the applied electric field E(t).

Calculating the effects of the electric field E may further include using the one-constant approximation of Frank elastic constants ($K_{11}=K_{22}=K_{33}=K$) for the analysis of director fluctuations effects in the LC slab. For this calculation, the Equipartition Theorem is used:

$$\langle n_x^2(q, E) \rangle = \frac{8 k_B T}{V} \frac{1}{Kq^2 + E^2} \quad \text{(EQN. 3a)}$$

is quenched by the electric field, and $$\langle n_y^2(q) \rangle = \frac{8 k_B T}{V} \frac{1}{Kq^2} \quad \text{(EQN. 3b)}$$

does not depend on the field; where $E^2(t)=\epsilon_0 |\Delta\epsilon| E^2(t)$ is a short-hand notation for the electric field energy density, $q=2\pi/L$ is the wave-vector of the modes for the director fluctuations ($q \cdot q = q^2 = q_x^2 + q_y^2 + q_z^2$), L is the linear dimension of a system, and V is its volume, $k_B$ is the Boltzmann constant, T is the absolute temperature.

The director fluctuations contribution is expressed through the sum over the spectrum of all modes of the wave vectors q with their own relaxation times $\tau_q$. An estimated fluctuation relaxation time, for the director fluctuations affected by the electric field of $E=10^8$ V m$^{-1}$, is of the order of magnitude $\tau_{fluc} \approx 0.4$ µs, what is still slower comparing to the order parameter characteristic times estimated by M. Gu et al [as taught in M. Gu et al., *Phys. Rev. E* 78, 040702(R), 2008]. $\tau(q,t)=\gamma/(q^2 K+E^2(t))$, where $\gamma$ is the effective viscosity of the LC which is actually weakly dependent on q [as taught in B. Gertner, K. Lindenberg, *J. Chem. Phys.* 94, 5143, 1991]. We work in the approximation that $\gamma$ is independent on q.

The relaxation dynamics of a fluctuation with the wavevector q could be described by linear response by EQN. 4:

$$\frac{\partial \langle n_\alpha^2(t, q) \rangle}{\partial t} = \frac{\langle n_\alpha^2(t, q) \rangle}{\tau(q, t)} - \frac{\overline{\langle n_\alpha^2(q, E(t)) \rangle}}{\tau(q, t)}, \quad \text{(EQN. 4)}$$

where $\alpha=x,y$; and the long overbars denote the mean square amplitudes under a stationary external field (at $t \to \infty$). For different q's, there are different stationary states and $\tau(q)$ which depend on the applied field E(t). The solution of EQN. 4 for a fluctuation with the wavenumber q is similar to the solution EQN. (2b):

$$\langle n_x^2(t, q, E) \rangle = e^{-\int_0^t \frac{Kq^2 + E^2(\bar{t})}{\gamma} d\bar{t}}$$

$$\int_0^t \frac{8 k_B T}{V} \frac{-E^2(t')}{Kq^2(Kq^2 + E^2(t'))} \frac{Kq^2 + E^2(t')}{\gamma} e^{\int_0^{t'} \frac{Kq^2 + E^2(t'')}{\gamma} dt''} dt'.$$

Working in the continuum limit, and replacing the discrete sum with an integral over a sphere, one obtains:

$$\langle n_x^2(t) \rangle = \frac{4}{\pi^2} \frac{k_B T}{\gamma} e^{-\int_0^t \lambda^2(t') dt'} \quad \text{(EQN. 5)}$$

$$\int_0^t -\sigma(t) e^{\int_0^{t'} \lambda^2(t'') dt''} \sqrt{\frac{\sigma(t-t')}{(t-t')\lambda(t-t')}} \frac{\sqrt{\pi}}{2} dt',$$

where $\lambda(t)=E^2(t)/\gamma$ and $\sigma(t)=E^2(t)/K$. All the director fluctuations could be divided into two types: slow soft fluctuations corresponding to small wavevectors $q^2 < E/K$ quenched by the external fields (for $Kq^2 \sim E$, $\lambda \approx \tau_q^{-1}$); and fast rigid fluctuations $q^2 > E/K$.

A probing beam may be applied (for example, using the laser 110 shown in FIG. 3) in either configuration of the LC materials. According to another embodiment, the probing beam propagates with an incidence angle $\theta=45°$ relative to the yz-plane of the LC materials.

The conventional geometry, with a normally incident probing beam, for measuring field induced birefringence change δn, is not optimal here, because the value of birefringence $\Delta n = n_e - n_o = \sqrt{\in_z} - \sqrt{\in_y}$ measured with a normal incidence probe beam, and its change δn, contains all three contributions—uniaxial and biaxial field-induced order and quenched director fluctuations—according to:

$$\delta n_N(t) = \left(\delta\varepsilon_u(t) + \frac{1}{2}\delta\varepsilon_b(t) + \delta\varepsilon_f(t)\right) \Big/ \tilde{n}_{LC}$$

where $\delta\in_f(t)$ is the effective birefringence change due to the director fluctuations quenching, $\tilde{n}_{LC}$ is the averaged refractive index used on approximation $n_e/n_o \to 1$, which is reasonable for the LC used.

In the geometry with the probing beam is in the xz-plane of the LC materials, director fluctuations quenching process is compensated and the uniaxial and biaxial order parameter contributions are:

$$\delta n_{BU}(t) = \left(\frac{1}{2}\delta\varepsilon_u(t) + \frac{3}{4}\delta\varepsilon_b(t)\right) \Big/ \tilde{n}_{LC}.$$

In the geometry with the probing beam is in xy-plane of the LC materials, the biaxial OP contribution is compensated; but the uniaxial OP and director fluctuations contribute to the optical response:

$$\delta n_{UF}(t) = \left(\delta\varepsilon_u(t) + \frac{3}{2}\delta f(t)\right) \Big/ \tilde{n}_{LC}.$$

The field induced dynamics of the birefringence change δn(t) may be measured as the intensity of a probing beam. In one embodiment (see FIG. 3), the probing beam is a He—Ne laser (λ=633 nm) traversing the 45-degree holder and the Soleil-Babinet compensator (SB-compensator) placed between two crossed polarizers $$I(t) = I_0 \sin^2\left[\frac{\pi(\delta n(t) + \Delta n_{\mathit{eff}})\bar{d}}{\lambda} + \frac{\phi_{SB}}{2}\right],$$

where $\bar{d} = \sqrt{2}d$ is the effective pathway of light in the cell of thickness d, $\Delta n_{\mathit{eff}}$ is the effective birefringence without electric field, and $\phi_{SB}$ is the controllable phase retardation introduced by the SB-compensator.

Optical phase compensation is suitably employed to adjust the observable light intensity I(t) to ½ of its maximum value $I_0$, where the sensitivity of the intensity to the change in the optical phase retardation δn(t) is maximized.

The optical response may be measured with $\phi_{SB}$ and $\phi_{SB}+\pi$ optical phase retardations of the SB-compensator, to make sure that the recorded data corresponds to the birefringence change of the LC cell, but not to any spurious parasitic changes of the light intensity.

Voltage pulses may be created with rise and fall times of several nanoseconds, for example using the modulating voltage source 820 of FIG. 11 or the modulating voltage source 920 of FIG. 12.

According to one embodiment, the modulating voltage source 820 or 920 is a pulse generator HV 1000 (Direct Energy) that is used to create voltage pulses up to 1 kV with rise and fall several nanoseconds, which may be described with exponential rise and decay. In practice, the achieved voltage amplitude $U_0$ with this source is not constant and shows a slow decrease with time. The voltage pulse may be modeled with the function $U_{ON}(t \le t_p) = U_0(e^{-\nu t} - e^{-\eta t})$ and $U_{OFF}(t > t_p) = U(t_p)e^{-\mu t}$, where $U_0$, $\nu$, $\eta$, and $\mu$ are the fitting parameters, and $t_p = 390$ ns was the duration of the voltage pulse.

The time dependence of the electric field E(t)=U(t)/d may be calculated according to EQN 6:

$$E_{ON}(t \le t_p) = \frac{U_0}{d}(e^{-\nu t} - e^{\eta t}) \qquad \text{(EQN. 6)}$$

and $$E_{OFF}(t > t_p) = \frac{U(t_p)}{d}e^{-\mu t}$$

EQN. 6 is used in the Kirchhoff equation for the RC-circuit and to obtain the energy density of an electric field inside the LC cell:

$$E_{ON}(t \le t_p) = E_0\left(-\frac{\zeta e^{-\eta t}}{\zeta-\eta} + \frac{\zeta e^{-\nu t}}{\zeta-\nu} + \frac{\zeta(\eta-\nu)e^{-\zeta t}}{(\zeta-\eta)(\zeta-\nu)}\right) \approx \qquad \text{(EQN. 7)}$$

$$E_0\left(-\frac{\zeta}{\zeta-\eta}e^{-\eta t} + 1 - \nu t + \frac{\eta}{\zeta-\eta}e^{-\zeta t}\right),$$

and $$E_{OFF}(t > t_p) = \left(E_{ON}(t_p) - \frac{E_0 \zeta}{\zeta-\mu}\right)e^{-\zeta\Delta t} + \frac{E_0\zeta}{\zeta-\mu}e^{-\mu\Delta t},$$

where $$E_0 = \frac{U_0}{d}\sqrt{\varepsilon_0|\Delta\varepsilon|},$$

$$\Delta t = t - t_p,$$

and $\zeta = 1/\tau_{RC}$ is the reciprocal to RC-time. EQN. 7 may be used to solve (EQN. 2b) and (EQN. 5).

The invention claimed is:

1. An optical modulator, comprising:
   a liquid crystal cell containing liquid crystal material having liquid crystal molecules oriented along a quiescent director direction in the unbiased state; and
   a voltage source configured to apply an electric field to the liquid crystal material wherein the direction of the applied electric field does not cause the quiescent director direction to change.

2. The optical modulator of claim 1 wherein the liquid crystal material has negative dielectric anisotropy and the voltage source is configured to apply an electric field to the liquid crystal material whose electric field vector is transverse to the quiescent director direction.

3. The optical modulator of claim 1 wherein the liquid crystal material has positive dielectric anisotropy and the voltage source is configured to apply an electric field to the liquid crystal material whose electric field vector is parallel with the quiescent director direction.

4. The optical modulator of claim 1 further comprising:
   an optical source arranged to transmit light through or reflect light off the liquid crystal cell with the light passing through the liquid crystal material at an angle effective to undergo phase retardation in response to the voltage source applying the electric field due to one or more of field-modified uniaxial order, field-modified biaxial order, and modified differential quenching of director fluctuations induced in the liquid crystal.

5. The optical modulator of claim 1 further comprising:
an optical source arranged to transmit a light beam through or reflect light off the liquid crystal cell so as to undergo phase retardation in response to the voltage source applying the electric field due to field-enhanced uniaxial order induced in the liquid crystal molecules.

6. The optical modulator of claim 1 further comprising:
an optical source arranged to transmit a light beam through or reflect light off the liquid crystal cell so as to undergo phase retardation in response to the voltage source applying the electric field due to field-induced biaxial order induced in the liquid crystal molecules.

7. The optical modulator of claim 1 further comprising:
an optical source arranged to transmit a light beam through or reflect light off the liquid crystal cell with a beam component of the light beam oriented transverse so as to undergo phase retardation in response to the voltage source applying the electric field due to differential quenching of uniaxial fluctuations induced in the liquid crystal molecules.

8. An optical modulator comprising:
a liquid crystal cell containing liquid crystal material having liquid crystal molecules oriented along a quiescent director direction in the unbiased state; and
a voltage source configured to apply an electric field to the liquid crystal material;
wherein one of:
(i) the liquid crystal material has negative dielectric anisotropy and the voltage source is configured to apply an electric field to the liquid crystal material whose electric field direction is transverse to the quiescent director direction; and
(ii) the liquid crystal material has positive dielectric anisotropy and the voltage source is configured to apply an electric field to the liquid crystal material whose electric field direction is parallel with the quiescent director direction.

9. The optical modulator of claim 8 wherein the liquid crystal material has negative dielectric anisotropy and the voltage source is configured to apply an electric field to the liquid crystal material whose electric field direction is transverse to the quiescent director direction.

10. The optical modulator of claim 8 wherein the liquid crystal material has positive dielectric anisotropy and the voltage source is configured to apply an electric field to the liquid crystal material whose electric field direction is parallel with the quiescent director direction.

11. The optical modulator of claim 8 further comprising:
an optical source arranged to transmit light through or reflect light off the liquid crystal cell with the light passing through the liquid crystal material at an angle effective to undergo phase retardation in response to the voltage source applying the electric field due to one or more of field-enhanced uniaxial order, field-induced biaxial order, and differential quenching of uniaxial fluctuations induced in the liquid crystal molecules.

12. The optical modulator of claim 8 further comprising:
an optical source arranged to transmit a light beam through or reflect light off the liquid crystal cell so as to undergo phase retardation in response to the voltage source applying the electric field due to one or more of field-enhanced uniaxial order, field-induced biaxial order, and differential quenching of uniaxial fluctuations, induced in the liquid crystal molecules.

13. The optical modulator of claim 8 wherein the liquid crystal cell comprises:
two substrates, wherein the liquid crystal material is disposed between the two substrates; and
at least two electrodes disposed between the two substrates and electrically connected to the voltage source.

14. The optical modulator of claim 8, wherein the liquid crystal material is in a state selected from the group consisting of: nematic, cholesteric (N*), twist-bend nematic, Spray-Blend nematic, biaxial nematic, SmA* Smectic, SmAP Smectic, de Vries Smectic, SmB Smectic, SmC Smectic, SmC* Smectic, SmCP Smectic, $SmC_G$ Smectic, SmD Smectic, SmE Smectic, SmF Smectic, SmG Smectic, SmH Smectic, SmI Smectic, SmJ Smectic, SmK Smectic, SmL Smectic, Columnar phases including disordered, ordered, and tilted packing within columns, hexagonal, rectangular, and oblique stacking of columns, Bent-core phases ($B_1$, $B_2$, $B_4$, $B_5$, $B_6$, $B_{7-I}$, or $B_{7-II}$), and Blue-Phases (I, II, or III).

15. The optical modulator of claim 8, wherein the liquid crystal material includes at least one additive selected from the group consisting of: nanoparticles, polymer networks, and polymer-stabilized systems.

16. An optical modulator device for modulating liquid crystal (LC) materials with nanoseconds response time, comprising:
a housing including LC material, the LC material having an orientational order and an optical axis;
a voltage source for applying an electric field to the LC material to affect the orientational order of the LC materials and fluctuations of the optical axis, thus affecting a birefringence of the LC materials without changing the director orientation.

17. The optical modulator device according to claim 16, wherein the electric field is altered based on binary values to affect the birefringence of the LC material.

18. The optical modulator device according to claim 16, further including:
an input light which is projected on the LC materials at an incident angle;
an output light which leaves the housing;
wherein the output light is modulated by the voltage source according to a binary value.

19. The optical modulator device according to claim 16, wherein the LC materials include positive dielectric anisotropy materials ($\Delta\epsilon>0$) in either a homeotropic or planar arrangement.

20. The optical modulator device of claim 16 further comprising:
an optical fiber including a fiber core clad by a cladding;
wherein the liquid crystal defines at least a portion of the cladding of the optical fiber.

* * * * *